United States Patent
Sakairi et al.

(10) Patent No.: US 8,915,648 B2
(45) Date of Patent: Dec. 23, 2014

(54) SYNTHETIC RESIN-MADE THRUST SLIDING BEARING

(75) Inventors: Yoshikazu Sakairi, Kanagawa (JP); Ryohei Kaneko, Kanagawa (JP); Kouichi Morishige, Kanagawa (JP); Tsuyoshi Nagashima, Kanagawa (JP); Mirai Shida, Kanagawa (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 13/514,384

(22) PCT Filed: Dec. 7, 2010

(86) PCT No.: PCT/JP2010/007122
§ 371 (c)(1),
(2), (4) Date: Jun. 7, 2012

(87) PCT Pub. No.: WO2011/070772
PCT Pub. Date: Jun. 16, 2011

(65) Prior Publication Data
US 2012/0243814 A1 Sep. 27, 2012

(30) Foreign Application Priority Data
Dec. 11, 2009 (JP) .................. 2009-282228

(51) Int. Cl.
| | | |
|---|---|---|
| F16C 17/04 | (2006.01) | |
| F16N 1/00 | (2006.01) | |
| F16C 17/18 | (2006.01) | |
| F16C 33/10 | (2006.01) | |
| B60G 15/06 | (2006.01) | |
| F16C 33/20 | (2006.01) | |
| F16C 33/74 | (2006.01) | |

(52) U.S. Cl.
CPC .............. *B60G 15/068* (2013.01); *F16C 17/18* (2013.01); *F16C 33/10* (2013.01); *B60G 2204/418* (2013.01); *F16C 33/20* (2013.01); *F16C 17/04* (2013.01); *F16C 33/74* (2013.01)
USPC ........................................... 384/420; 384/368

(58) Field of Classification Search
USPC ........................................ 384/420–427, 368
See application file for complete search history.

(56) References Cited

U.S. PATENT DOCUMENTS

| | | | | |
|---|---|---|---|---|
| 5,476,326 | A | * 12/1995 | Ueno et al. ..................... | 384/125 |
| 7,273,317 | B2 | * 9/2007 | Miyata et al. .................. | 384/420 |
| 2006/0215944 | A1 | 9/2006 | Watai et al. | |
| 2007/0116391 | A1 | * 5/2007 | Watai et al. .................... | 384/420 |

(Continued)

FOREIGN PATENT DOCUMENTS

| | | |
|---|---|---|
| JP | 2-1532 | 1/1990 |
| JP | 2-6263 | 2/1990 |

(Continued)

OTHER PUBLICATIONS

Translation of JP2005-008737 obtained Jun. 5, 2013.*

(Continued)

*Primary Examiner* — James Pilkington
(74) *Attorney, Agent, or Firm* — Nixon & Vanderhye, PC

(57) ABSTRACT

A synthetic resin-made thrust sliding bearing includes a synthetic resin-made upper casing, a synthetic resin-made lower casing, and a synthetic resin-made thrust sliding bearing piece interposed between the upper casing and the lower casing.

12 Claims, 6 Drawing Sheets

(56) References Cited

U.S. PATENT DOCUMENTS

| | | | |
|---|---|---|---|
| 2007/0237439 A1 * | 10/2007 | Watai et al. | 384/420 |
| 2009/0180719 A1 * | 7/2009 | Miyata et al. | 384/147 |
| 2009/0298981 A1 * | 12/2009 | Nagai et al. | 524/261 |

FOREIGN PATENT DOCUMENTS

| | | | |
|---|---|---|---|
| JP | 4-52488 | | 12/1992 |
| JP | 9-72339 | * | 3/1997 |
| JP | 9-310001 | | 12/1997 |
| JP | 9-310004 | | 12/1997 |
| JP | 9-316281 | | 12/1997 |
| JP | 2003-269458 | * | 9/2003 |
| JP | 2004-176728 | | 6/2004 |
| JP | 2004-263771 | | 9/2004 |
| JP | 2005-008737 | * | 1/2005 |
| JP | 2008-31416 | | 2/2008 |
| WO | WO2007/132556 | * | 11/2007 |
| WO | WO 2009/041052 | | 4/2009 |

OTHER PUBLICATIONS

International Search Report for PCT/JP2010/007122, mailed Mar. 15, 2011.

* cited by examiner

SYNTHETIC RESIN-MADE THRUST SLIDING BEARING

This application is the U.S. national phase of International Application No. PCT/JP2010/007122 filed 7 Dec. 2010 which designated the U.S. and claims priority to JP Patent Application No. 2099-282228 filed 11 Dec. 2009, the entire contents of each of which are hereby incorporated by reference.

TECHNICAL FIELD

The present invention relates particularly to a synthetic resin-made thrust sliding bearing, and more particularly to a synthetic resin-made thrust sliding bearing which is suitably incorporated as a thrust sliding bearing of a strut-type suspension (Macpherson type) in a four-wheeled motor vehicle.

BACKGROUND ART

In general, a strut-type suspension is mainly used in a front wheel of a four-wheeled motor vehicle, and is constructed such that a strut assembly incorporating a hydraulic shock absorber in a cylinder formed integrally with a main shaft is combined with a coil spring. Among such suspensions, (1) there is a type of structure in which the axis of the coil spring is actively offset with respect to the axis of the strut, so as to allow the sliding of a piston rod of the shock absorber incorporated in that strut to be effected smoothly, and (2) there is another type of structure in which the coil spring is disposed by aligning the axis of the coil spring with the axis of the strut. In either structure, a thrust bearing is disposed between a mounting member for a motor vehicle body and an upper spring seat of the coil spring to allow the rotation to be effected smoothly when the strut assembly rotates together with the coil spring by the steering operation.

PRIOR ART DOCUMENTS

Patent Documents

Patent Document 1: JP-UM-B-4-52488
Patent Document 2: JP-UM-B-2-1532
Patent Document 3: JP-UM-B-2-6263

SUMMARY OF THE INVENTION

Problems that the Invention is to Solve

Further, in this thrust bearing, a rolling bearing using balls or needles or a synthetic resin-made sliding bearing is used. However, the rolling bearing has a possibility of causing a fatigue failure in the balls or needles owing to such as infinitesimal oscillations and a vibratory load, so that there is a problem in that it is difficult to maintain a smooth steering operation. As compared with the rolling bearing, the sliding bearing has a high frictional torque and therefore has the problem that the steering operation is made heavy. Furthermore, both bearings have the problem that the steering operation is made heavy due to the high frictional force of a dust seal formed of a rubber elastomer fitted to prevent the ingress of foreign objects such as dust onto sliding surfaces, and the synthetic resin-made sliding bearing in particular has the problem that the steering operation is made much heavier.

To overcome the above-described problems, the present applicant proposed thrust bearings which are each comprised of a synthetic resin-made upper casing, a synthetic resin-made lower casing, and a synthetic resin-made thrust sliding bearing piece interposed between the upper and lower casings, wherein the upper and lower casings are combined by resilient fitting (snap fitting), and a resiliently fitting portion and a sealing portion based on labyrinth action are respectively formed between the upper and lower casings and between an inner peripheral surface side and an outer peripheral surface side, to prevent the entry of foreign objects such as dust onto the bearing sliding surface by means of that sealing portion (described in Patent Document 1, Patent Document 2, and Patent Document 3).

This thrust bearing will be described with reference to drawings as follows. In FIGS. 14 and 15, a synthetic resin-made thrust sliding bearing 1 is disposed between, on the one hand, a vehicle body side mounting member X which is fixed to a vehicle body side by means of a mount insulator and, on the other hand, a flat upper surface Q1 of an upper spring seat Q which is used for a coil spring C and is disposed in such a manner as to oppose a lower surface X1 of the vehicle body side mounting member X and surround an outer peripheral surface P1 of a piston rod P fixed at one end to the vehicle body side mounting member X. This synthetic resin-made thrust sliding bearing 1 is comprised of a synthetic resin-made upper casing 10, a synthetic resin-made lower casing 20, and a synthetic resin-made thrust sliding bearing piece 30 interposed between the upper and lower casings 10 and 20. The upper casing 10 includes an annular flat plate-shaped portion 12 having a circular hole 11 in its central portion, a cylindrical suspended portion 13 formed integrally at an outer peripheral edge of the annular flat plate-shaped portion 12, and a hook-shaped annular engaging portion 14 formed on an inner peripheral surface of an end portion of the cylindrical suspended portion 13. Meanwhile, the lower casing 20 includes a cylindrical portion 22 having an inner peripheral surface defining a circular hole 21, an annular flat plate-shaped portion 25 formed integrally on an outer peripheral surface of the cylindrical portion 22 in such a manner as to cause a portion 24 of the cylindrical portion 22 to project, a cylindrical projection 26 formed integrally at an outer peripheral edge of the annular flat plate-shaped portion 25, and an annular engaged portion 27 formed on an outer peripheral surface of an end of the cylindrical projection 26. The upper casing 10 is combined with the lower casing 20 by causing its annular engaging portion 14 to be resiliently fitted to the annular engaged portion 27.

With these synthetic resin-made thrust sliding bearings, the dust seal, which is formed of a rubber elastomer and fitted between the sliding surfaces with the intermediacy of a lubricating grease in such a manner as to surround the sliding surfaces is made unnecessary, so that it is possible to overcome the problem of an increase in the steering operating force caused by the dust seal, and it is possible to obtain a stable and smooth steering operating force by preventing as practically as possible the entry of foreign objects such as dust onto the sliding surfaces.

However, a problem was newly found in that, depending on the combination of synthetic resins for forming the upper and lower casings and the thrust sliding bearing piece interposed between the upper and lower casings in the above-described thrust sliding bearing, and, in addition to the combination of these synthetic resins, depending on the combination of a lubricating grease interposed at sliding interfaces between, on the one hand, the upper and lower casings and, on the other hand, the thrust sliding bearing piece interposed between the upper and lower casings, a stick-slip phenomenon can occur between each of the upper and lower casings and the thrust sliding bearing piece, and abnormal frictional noise attributable to the stick-slip phenomenon can often be generated.

This stick-slip phenomenon can occur when the coefficient of friction decreases with an increase in the sliding velocity and when a discontinuous decline in friction is involved at the time of a transition from static friction to dynamic friction, and its cycle is determined by such as the sliding velocity and the elastic properties of the system. It should be noted, however, that it is not only the velocity characteristic of friction but also the formation and breakage of microscopic adhesive portions between friction surfaces are related to it.

If the above-described Patent Documents 1 to 3 are considered from this viewpoint, in these patent documents descriptions are given of examples in which a polyethylene resin is used as the thrust sliding bearing piece and examples in which a silicone grease is used as lubricating grease in order to avoid the stick-slip phenomenon, and it is described that, in their combinations, low friction characteristics are exhibited and a stable steering force can be maintained for extended periods of time.

However, the polyethylene resin is such a resin that, if the catalyst and the polymerization method are changed, its properties such as the density, melt flow rate (MFR), crystallinity, branching degree, cross-linking degree, and molecular weight distribution can be adjusted over wide ranges, and polyethylene resins are classified into those with low molecular weight, medium molecular weight, high molecular weight [low density (LDPE), medium density (MDPE), and high density (HDPE)], and ultrahigh molecular weight. The present inventors confirmed through various performance evaluation tests that, in sliding between synthetic resins, not all polyethylene resins effectively function as thrust sliding bearing pieces.

As a result of conducting strenuous studies in view of the above-described circumstances, the present inventors found that, if the thrust sliding bearing piece is formed of a specific polyethylene resin, this thrust sliding bearing piece or a combination of this thrust sliding bearing piece and a lubricating grease, preferably a specific silicone grease, makes it possible to exhibit low friction characteristics without the occurrence of the stick-slip and maintain a stable steering force for extended periods of time.

The present invention has been devised on the basis of the above-described finding, and its object is to provide a synthetic resin-made thrust sliding bearing which is comprised of synthetic resin-made upper and lower casings and a synthetic resin-made thrust sliding bearing piece interposed between the upper and lower casings, and which is capable of maintaining low friction characteristics over extended periods of time and preventing the occurrence of the stick-slip phenomenon during sliding, thereby making it possible to prevent the generation of abnormal frictional noise attributable to the stick-slip phenomenon.

Means for Overcoming the Problems

A synthetic resin-made thrust sliding bearing in accordance with the present invention includes: a synthetic resin-made upper casing having an upper annular flat plate-shaped portion; a synthetic resin-made lower casing having a lower annular flat plate-shaped portion which is superposed on the upper casing so as to be rotatable about an axis of the upper casing and opposes the upper annular flat plate-shaped portion, a first and a second annular projection disposed on the lower annular flat plate-shaped portion concentrically therewith, and a lower annular recess surrounded by the first and the second annular projection; a synthetic resin-made thrust sliding bearing piece constituted by a disk which is disposed in the lower annular recess, is brought into sliding contact with an upper surface of the lower annular flat plate-shaped portion defining a bottom surface of the lower annular recess and a lower surface of the upper annular flat plate-shaped portion, and has a circular hole in a central portion thereof; and a lubricating grease interposed at sliding interfaces between, on the one hand, the lower surface of the upper annular flat plate-shaped portion and the upper surface of the lower annular flat plate-shaped portion defining the bottom surface of the lower annular recess and, on the other hand, an upper surface and a lower surface of the thrust sliding bearing piece which are respectively brought into sliding contact with the lower surface and the upper surface, the upper casing being combined with the lower casing by causing an outer peripheral edge thereof to be resiliently fitted to an outer peripheral edge of the lower casing, the synthetic resin-made thrust sliding bearing characterized in that the thrust sliding bearing piece is formed of a polyethylene resin whose density is 0.925 to 0.970 g/cm$^3$ and whose melt flow rate (190° C., 2160 g) defined by ISO 1133 (corresponding to JIS K 7210 or ASTM D 1238) is 0.1 to 20 g/10 min.

According to the synthetic resin-made thrust sliding bearing in accordance with the present invention, the thrust sliding bearing piece is formed of a polyethylene resin whose density is 0.930 to 0.970 g/cm$^3$, preferably 0.930 to 0.970 g/cm$^3$, and whose melt flow rate (190° C., 2160 g) defined by ISO 1133 (corresponding to JIS K 7210 or ASTM D 1238) is 0.1 to 20 g/10 min, preferably 0.1 to 15 g/10 min. By using a polyethylene resin having such a melt viscosity, the effect of inhibiting mold deposits is sufficiently exhibited on the mold surface and it is possible to obtain the effect of improving stability. In addition, in the sliding characteristics, in cases where the mating member is a synthetic resin, low friction characteristics are exhibited, smooth sliding is effected over extended periods of time without the occurrence of the stick-slip phenomenon, and abnormal frictional noise attributable to the stick-slip phenomenon is not generated.

Here, if specific examples of the above-described polyethylene resin are cited, it is possible to cite "Novatec UJ960 (tradename)" made by Japan Polyethylene Corporation and exhibiting a density of 0.935 g/cm$^3$ and a melt flow rate of 5 g/10 min, "HI-ZEX 1300J (tradename)" made by Prime Polymer Co., Ltd. and exhibiting a density of 0.961 g/cm$^3$ and a melt flow rate of 12 g/10 min, "HI-ZEX 2100J (tradename)" made by Prime Polymer Co., Ltd. and exhibiting a density of 0.953 g/cm$^3$ and a melt flow rate of 5.8 g/10 min, "HI-ZEX 1608J (tradename)" made by Prime Polymer Co., Ltd. and exhibiting a density of 0.955 g/cm$^3$ and a melt flow rate of 18 g/10 min, "Novatec HJ560 (tradename)" made by Japan Polyethylene Corporation and exhibiting a density of 0.964 g/cm$^3$ and a melt flow rate of 7 g/10 min, "Suntec J340 (tradename)" made by Asahi Kasei Chemicals Corporation and exhibiting a density of 0.951 g/cm$^3$ and a melt flow rate of 7 g/10 min, "Novatec HD HB 120R (tradename)" made by Japan Polyethylene Corporation and exhibiting a density of 0.938 g/cm$^3$ and a melt flow rate of 0.2 g/10 min, "Novatec HD HB424R (tradename)" made by Japan Polyethylene Corporation and exhibiting a density of 0.957 g/cm$^3$ and a melt flow rate of 0.25 g/10 min, "Suntec HD B970 (tradename)" made by Asahi Kasei Chemicals Corporation and exhibiting a density of 0.956 g/cm$^3$ and a melt flow rate of 0.25 g/10 min, and "Suntec HD B891 (tradename)" made by Asahi Kasei Chemicals Corporation and exhibiting a density of 0.957 g/cm$^3$ and a melt flow rate of 0.16 g/10 min.

In the present invention, as the lubricating grease interposed at sliding interfaces between, on the one hand, the lower surface of the upper annular flat plate-shaped portion and the upper surface of the lower annular flat plate-shaped portion defining the bottom surface of the lower annular recess and, on the other hand, the upper surface and the lower surface of the thrust sliding bearing piece formed of the above-described specific polyethylene resin for being brought into sliding contact with the lower surface and the upper surface, it is preferable to adopt the combination with, in particular, a silicone grease whose base oil is a silicone oil, whose kinetic viscosity at 25° C. is not less than 100 cSt and not more than 500,000 cSt, and in which a thickener is contained to set its mixture consistency to not less than 200 and not more than 400. Furthermore, it is more preferable to adopt the combination with a silicone grease whose base oil is a silicone oil, whose kinetic viscosity at 25° C. is not less than 1,000 cSt and not more than 100,000 cSt, and in which a thickener is contained to set its mixture consistency to not less than 250 and not more than 350.

In the thrust sliding bearing in which a silicone grease whose base oil is a silicone oil, whose kinetic viscosity at 25° C. is not less than 100 cSt and not more than 500,000 cSt, and in which a thickener is contained to set its mixture consistency to not less than 200 and not more than 400, preferably not less than 250 and not more than 350 is interposed at sliding interfaces between, on the one hand, the synthetic resin-made upper casing and lower casing and, on the other hand, the thrust sliding bearing piece interposed between the upper casing and the lower casing and formed of a polyethylene resin whose density is 0.925 to 0.970 g/cm$^3$, preferably 0.930 to 0.970 g/cm$^3$, and whose melt flow rate (190° C., 2160 g) defined by ISO 1133 (corresponding to JIS K 7210 or ASTM D 1238) is 0.1 to 20 g/10 min, preferably 0.1 to 15 g/10 min, enhanced low friction characteristics are exhibited over extended periods of time, coupled with the low friction characteristics of the thrust sliding bearing piece itself, to thereby enable smooth sliding, and the stick-slip phenomenon does not occur during sliding, so that abnormal frictional noise attributable to the stick-slip phenomenon is not generated.

In a preferred example of the present invention, the upper annular flat plate-shaped portion has a circular hole in a central portion thereof, and the lower annular flat plate-shaped portion has in a central portion thereof a circular hole communicating with the circular hole of the upper annular flat plate-shaped portion, wherein the upper casing has a cylindrical suspended portion formed integrally on an outer peripheral edge of the upper annular flat plate-shaped portion and an annular engaging portion formed on an inner peripheral surface of the cylindrical suspended portion, and the lower casing has an annular engaged portion formed on an outer peripheral surface of the second annular projection, the first annular projection having an inside diameter identical to that of the circular hole of the lower annular flat plate-shaped portion and being formed integrally on the upper surface of the lower annular flat plate-shaped portion, the second annular projection being formed integrally on an outer peripheral edge of the lower annular flat plate-shaped portion in such a manner as to be radially outwardly spaced apart a predetermined interval from the first annular projection, so as to form the lower annular recess in cooperation with the first annular projection and the upper surface of the lower annular flat plate-shaped portion, the upper casing being combined with the lower casing by causing the annular engaging portion to be resiliently fitted to the annular engaged portion.

With the synthetic resin-made thrust sliding bearing of this example, since the upper casing and the lower casing are combined to each other by the resilient fitting of the annular engaging portion with the annular engaged portion, the assembly operation thereof can be performed extremely simply.

In another preferred example of the synthetic resin-made thrust sliding bearing in accordance with the present invention, an inner peripheral surface of the thrust sliding bearing piece defining a circular hole in a central portion thereof has an inside diameter larger than an outside diameter of the first annular projection, and an outer peripheral surface of the thrust sliding bearing piece has an outside diameter smaller than an inside diameter of the second annular projection, wherein the thrust sliding bearing piece is disposed in the lower annular recess with annular clearances provided respectively between the inner peripheral surface defining the circular hole thereof and an outer peripheral surface of the first annular projection and between that outer peripheral surface and an inner peripheral surface of the second annular projection, the lubricating grease being filled and held in each of the annular clearances.

According to the synthetic resin-made thrust sliding bearing of such an example, since the thrust sliding bearing piece is formed of a polyethylene resin whose density is 0.925 to 0.970 g/cm$^3$ and whose melt flow rate (190° C., 2160 g) defined by ISO 1133 (corresponding to JIS K 7210 or ASTM D 1238) is 0.1 to 20 g/10 min, low friction characteristics are exhibited between the synthetic resin-made upper casing and lower casing between which the thrust sliding bearing piece is interposed. Additionally, since the lubricating grease, preferably the above-described silicone grease, is constantly supplied to the sliding interface between the lower surface of the thrust sliding bearing piece and the upper surface of the lower annular flat plate-shaped portion defining the bottom surface of the lower annular recess, enhanced low friction characteristics are exhibited by virtue of the synergistic effect derived from the low friction characteristics of the thrust sliding bearing piece itself and the low friction characteristics of the lubricating grease to thereby enable smooth sliding over extended periods of time without the occurrence of the stick-slip phenomenon at the sliding surfaces, so that abnormal frictional noise attributable to the stick-slip phenomenon is not generated.

In still another preferred example of the synthetic resin-made thrust sliding bearing in accordance with the present invention, the upper annular flat plate-shaped portion has a circular hole in a central portion thereof, and the lower annular flat plate-shaped portion has in a central portion thereof a circular hole communicating with the circular hole of the upper annular flat plate-shaped portion, wherein the upper casing has a first cylindrical suspended portion formed integrally on the lower surface of the upper annular flat plate-shaped portion in such a manner as to be radially outwardly spaced apart a predetermined interval from a peripheral edge of the circular hole of the upper annular flat plate-shaped portion, a second cylindrical suspended portion formed integrally on an outer peripheral edge of the upper annular flat plate-shaped portion in such a manner as to be radially outwardly spaced apart a predetermined interval from the first cylindrical suspended portion, so as to form an upper outer annular groove in cooperation with the first cylindrical suspended portion, and an annular engaging portion formed on an inner peripheral surface of the second cylindrical suspended portion, and wherein the lower casing has a third annular projection formed integrally on an outer peripheral edge of the lower annular flat plate-shaped portion in such a manner as to be radially outwardly spaced apart a predetermined interval from the second annular projection, so as to form a lower outer annular groove in cooperation with the second annular projection, and an annular engaged portion formed on an outer peripheral surface of the third annular projection, the first annular projection having an inside diameter identical to that of the circular hole of the lower annular flat plate-shaped portion and being formed integrally on the upper surface of the lower annular flat plate-shaped portion, the second annular projection being formed integrally on the upper surface of the lower annular flat plate-shaped portion in such a manner as to be radially outwardly spaced apart a predetermined interval from the first annular projection, so as to form the lower annular recess in cooperation with the first annular projection and the upper surface of the lower annular flat plate-shaped portion, the upper casing being combined with the lower casing by disposing an end portion of the first cylindrical suspended portion in the lower outer annular groove so as to be radially superposed on each of the second annular projection and the third annular projection, and by causing the annular engaging portion to be resiliently fitted to the annular engaged portion.

According to the synthetic resin-made thrust sliding bearing of this example, sealed portions based on labyrinth action are formed at superposed portions of, on the one hand, the first cylindrical suspended portion and, on the other hand, the second annular projection and the third annular projection and at resiliently fitting portions of the annular engaging portion and the annular engaged portion. As a result, it is possible to prevent the entry of foreign objects such as dust onto sliding interfaces between the upper casing and the lower casing and, hence, between, on the one hand, the upper casing and the lower casing and, on the other hand, the thrust sliding bearing piece interposed between the upper casing and the lower casing, so that smooth sliding is effected constantly.

In such a synthetic resin-made thrust sliding bearing, the following construction may be provided. An inner peripheral surface of the thrust sliding bearing piece defining a circular hole in a central portion thereof has an inside diameter larger than an outside diameter of the first annular projection, and an outer peripheral surface of the thrust sliding bearing piece has an outside diameter smaller than an inside diameter of the second annular projection, wherein the thrust sliding bearing piece is disposed in the lower annular recess with annular clearances provided respectively between the inner peripheral surface defining the circular hole thereof and an outer peripheral surface of the first annular projection and between that outer peripheral surface and an inner peripheral surface of the second annular projection, the lubricating grease, preferably the above-described silicone grease, being filled and held in each of the annular clearances and the lower annular groove.

According to this synthetic resin-made thrust sliding bearing, since the thrust sliding bearing piece is formed of a polyethylene resin whose density is 0.925 to 0.970 g/cm$^3$ and whose melt flow rate (190° C., 2160 g) defined by ISO 1133 (corresponding to JIS K 7210 or ASTM D 1238) is 0.1 to 20 g/10 min, low friction characteristics are exhibited between the synthetic resin-made upper casing and lower casing between which the thrust sliding bearing piece is interposed. Additionally, since the lubricating grease, preferably the above-described silicone grease, is constantly supplied to the sliding interface between the lower surface of the thrust sliding bearing piece and the upper surface of the lower annular flat plate-shaped portion defining the bottom surface of the lower annular recess of the lower casing, enhanced low friction characteristics are exhibited by virtue of the synergistic effect derived from the low friction characteristics of the thrust sliding bearing piece itself and the low friction characteristics of the lubricating grease to thereby enable smooth sliding over extended periods of time without the occurrence of the stick-slip phenomenon at the sliding surfaces, so that abnormal frictional noise attributable to the stick-slip phenomenon is not generated. In addition, since the lubricating grease is filled and held in the lower outer annular groove, foreign objects such as dust which entered from the resiliently fitting portions of the annular engaging portion and the annular engaged portion are captured by the lubricating grease filled and held in that lower outer annular groove, and are thereby prevented from entering the sliding interface. Hence, a dual prevention effect is exhibited with respect to the entry of foreign objects such as dust by virtue of the sealed portions based on the labyrinth action.

In a further preferred example of the synthetic resin-made thrust sliding bearing in accordance with the present invention, the following construction may be provided. The upper annular flat plate-shaped portion has a circular hole in a central portion thereof, and the lower annular flat plate-shaped portion has in a central portion thereof a circular hole communicating with the circular hole of the upper annular flat plate-shaped portion, wherein the upper casing has a first cylindrical suspended portion formed integrally on the lower surface of the upper annular flat plate-shaped portion and having an inside diameter identical to that of the circular hole of the upper annular flat plate-shaped portion, a second cylindrical suspended portion formed integrally on the lower surface of the upper annular flat plate-shaped portion in such a manner as to be radially outwardly spaced apart a predetermined interval from an outer peripheral surface of the first cylindrical suspended portion, so as to form an upper annular recess in cooperation with the first cylindrical suspended portion and the lower surface of the upper annular flat plate-shaped portion, a third cylindrical suspended portion formed integrally on an outer peripheral edge of the upper annular flat plate-shaped portion in such a manner as to be radially outwardly spaced apart a predetermined interval from the second cylindrical suspended portion, so as to form an upper annular groove in cooperation with the second cylindrical suspended portion, and an annular engaging portion formed on an inner peripheral surface of the third cylindrical suspended portion, and wherein the lower casing has a third annular projection formed integrally on an outer peripheral edge of the lower annular flat plate-shaped portion in such a manner as to be radially outwardly spaced apart a predetermined interval from an outer peripheral surface of the second annular projection, so as to form a lower outer annular groove in cooperation with the second annular projection and the upper surface of the lower annular flat plate-shaped portion, and an annular engaged portion formed on the outer peripheral surface of the third annular projection, the first annular projection being formed integrally on the upper surface of the lower annular flat plate-shaped portion in such a manner as to be radially outwardly spaced apart from the circular hole of the lower annular flat plate-shaped portion via an annular shoulder portion, the second annular projection being formed integrally on the upper surface of the lower annular flat plate-shaped portion in such a manner as to be radially outwardly spaced apart a predetermined interval from the first annular projection, so as to form the lower annular recess in cooperation with the first annular projection and the upper surface of the lower annular flat plate-shaped portion, the upper casing being combined with the lower casing by radially superposing the first cylindrical suspended portion on the first annular projection, by disposing an end portion of the second cylindrical suspended portion in the lower outer annular groove so as to be radially superposed on each of the second annular projection and the third annular projection, and by causing the annular engaging portion to be resiliently fitted to the annular engaged portion.

According to the synthetic resin-made thrust sliding bearing of this example, sealed portions based on labyrinth action are formed at superposed portions of the first cylindrical suspended portion and the first annular projection, at superposed portions of, on the one hand, the second cylindrical suspended portion and, on the other hand, the second annular projection and the third annular projection, and at resiliently fitting portions of the annular engaging portion and the annular engaged portion. As a result, it is possible to prevent the entry of foreign objects such as dust onto sliding interfaces between the upper casing and the lower casing and, hence, between, on the one hand, the upper casing and the lower casing and, on the other hand, the thrust sliding bearing piece interposed between the upper casing and the lower casing, so that smooth sliding is effected constantly.

Also in the synthetic resin-made thrust sliding bearing of this example, the following construction may be provided. The inner peripheral surface of the thrust sliding bearing piece defining a circular hole in a central portion thereof has an inside diameter larger than an outside diameter of the first annular projection, and the outer peripheral surface of the thrust sliding bearing piece has an outside diameter smaller than an inside diameter of the second annular projection, wherein the thrust sliding bearing piece is disposed in the lower annular recess with annular grooves provided respectively between the inner peripheral surface defining the circular hole thereof and an outer peripheral surface of the first annular projection and between that outer peripheral surface and an inner peripheral surface of the second annular projection, the lubricating grease, preferably the above-described silicone grease, being filled and held in each of the annular clearances and the lower outer annular groove.

Also in such a synthetic resin-made thrust sliding bearing, since the thrust sliding bearing piece is formed of a polyethylene resin whose density is 0.925 to 0.970 g/cm$^3$ and whose melt flow rate (190° C., 2160 g) defined by ISO 1133 (corresponding to JIS K 7210 or ASTM D 1238) is 0.1 to 20 g/10 min, low friction characteristics are exhibited between the synthetic resin-made upper casing and lower casing between which the thrust sliding bearing piece is interposed. Additionally, since the lubricating grease, preferably the above-described silicone grease, is constantly supplied to the sliding interface between the lower surface of the thrust sliding bearing piece and the upper surface of the lower annular flat plate-shaped portion defining the bottom surface of the lower annular recess of the lower casing, enhanced low friction characteristics are exhibited by virtue of the synergistic effect derived from the low friction characteristics of the thrust sliding bearing piece itself and the low friction characteristics of the lubricating grease to thereby enable smooth sliding over extended periods of time without the occurrence of the stick-slip phenomenon at the sliding surfaces, so that abnormal frictional noise attributable to the stick-slip phenomenon is not generated. In addition, since the lubricating grease is filled and held in the lower outer annular groove, foreign objects such as dust which entered from the resiliently fitting portions of the annular engaging portion and the annular engaged portion are captured by the lubricating grease filled and held in that lower outer annular groove, and are thereby prevented from entering the sliding interface. Hence, a dual prevention effect is exhibited with respect to the entry of foreign objects such as dust by virtue of the sealed portions based on the labyrinth action.

In a still further preferred example of the synthetic resin-made thrust sliding bearing in accordance with the present invention, the upper annular flat plate-shaped portion has a circular hole in a central portion thereof, and the lower annular flat plate-shaped portion has in a central portion thereof a circular hole communicating with the circular hole of the upper annular flat plate-shaped portion, wherein the upper casing has a first cylindrical suspended portion formed integrally on the lower surface of the upper annular flat plate-shaped portion in such a manner as to be radially outwardly spaced apart from the circular hole of the upper annular flat plate-shaped portion via an annular shoulder portion, a second cylindrical suspended portion formed integrally on the lower surface of the upper annular flat plate-shaped portion in such a manner as to be radially outwardly spaced apart a predetermined interval from an outer peripheral surface of the first cylindrical suspended portion, so as to form an upper annular recess in cooperation with the first cylindrical suspended portion and the lower surface of the upper annular flat plate-shaped portion, a third cylindrical suspended portion formed integrally on an outer peripheral edge of the upper annular flat plate-shaped portion in such a manner as to be radially outwardly spaced apart a predetermined interval from the second cylindrical suspended portion, so as to form an upper outer annular groove in cooperation with the second cylindrical suspended portion, and an annular engaging portion formed on an inner peripheral surface of the third cylindrical suspended portion, and wherein the lower casing has a third annular projection formed integrally on the lower annular flat plate-shaped portion and having an inside diameter identical to that of the circular hole of the lower annular flat plate-shaped portion, a fourth annular projection formed integrally on an outer peripheral edge of the lower annular flat plate-shaped portion in such a manner as to be radially outwardly spaced apart a predetermined interval from the second annular projection, so as to form a lower outer annular groove in cooperation with the second annular projection, and an annular engaged portion formed on the outer peripheral surface of the fourth annular projection, the first annular projection being formed integrally on the upper surface of the lower annular flat plate-shaped portion in such a manner as to be radially outwardly spaced apart a predetermined interval from the third annular projection, so as to form a lower inner annular groove in cooperation with the third annular projection, the second annular projection being formed integrally on the upper surface of the lower annular flat plate-shaped portion in such a manner as to be radially spaced apart a predetermined interval from the first annular projection, so as to form the lower annular recess in cooperation with the first annular projection and the upper surface of the lower annular flat plate-shaped portion, the upper casing being combined with the lower casing by disposing an end portion of the first cylindrical suspended portion in the lower inner annular groove so as to be radially superposed on the first annular projection and the third annular projection, respectively, by disposing an end portion of the second cylindrical suspended portion in the lower outer annular groove so as to be radially superposed on the second annular projection and the fourth annular projection, respectively, and by causing the annular engaging portion to be resiliently fitted to the annular engaged portion.

According to the synthetic resin-made thrust sliding bearing of this example, sealed portions based on labyrinth action are formed at superposed portions of, on the one hand, the first cylindrical suspended portion and, on the other hand, the first annular projection and the third annular projection, at superposed portions of, on the one hand, the second cylindrical suspended portion and, on the other hand, the second annular projection and the fourth annular projection, and at resiliently fitting portions of the annular engaging portion and the annular engaged portion, respectively. As a result, it is possible to prevent the entry of foreign objects such as dust onto sliding interfaces between the upper casing and the lower casing and, hence, between, on the one hand, the upper casing and the lower casing and, on the other hand, the thrust sliding bearing piece interposed between the upper casing and the lower casing, so that smooth sliding is effected constantly.

In the synthetic resin-made thrust sliding bearing of this example, the following construction may be provided. The inner peripheral surface of the thrust sliding bearing piece defining a circular hole in a central portion thereof has an inside diameter larger than an outside diameter of the first annular projection, and the thrust sliding bearing piece is disposed in the lower annular recess with annular clearances provided respectively between the inner peripheral surface defining the circular hole thereof and an outer peripheral surface of the first annular projection and between that outer peripheral surface and an inner peripheral surface of the second annular projection, the aforementioned lubricating grease, preferably the above-described silicone grease, being filled and held in each of the annular clearances, the lower inner annular groove, and the lower outer annular groove.

According to such a synthetic resin-made thrust sliding bearing, since the thrust sliding bearing piece is formed of a polyethylene resin whose density is 0.925 to 0.970 g/cm$^3$ and whose melt flow rate (190° C., 2160 g) defined by ISO 1133 (corresponding to JIS K 7210 or ASTM D 1238) is 0.1 to 20 g/10 min, low friction characteristics are exhibited between the synthetic resin-made upper casing and lower casing between which the thrust sliding bearing piece is interposed. Additionally, since the lubricating grease, preferably the above-described silicone grease, is constantly supplied to the sliding interface between the lower surface of the thrust sliding bearing piece and the upper surface of the lower annular flat plate-shaped portion defining the bottom surface of the lower annular recess of the lower casing, enhanced low friction characteristics are exhibited by virtue of the synergistic effect derived from the low friction characteristics of the thrust sliding bearing piece itself and the low friction characteristics of the lubricating grease to thereby enable smooth sliding over extended periods of time without the occurrence of the stick-slip phenomenon at the sliding surfaces, so that abnormal frictional noise attributable to the stick-slip phenomenon is not generated. In addition, since the lubricating grease is filled and held in each of the lower inner annular groove and the lower outer annular groove, foreign objects such as dust which entered from the resiliently fitting portions of the annular engaging portion and the annular engaged portion or the labyrinth portion on the inside diameter side are captured by the lubricating grease filled and held in the lower inner annular groove and the lower outer annular groove, and are thereby prevented from entering the sliding interface. Hence, a dual prevention effect is exhibited with respect to the entry of foreign objects such as dust on the inside diameter side and the outside diameter side by virtue of the sealed portions based on the labyrinth action.

In a further preferred example of the synthetic resin-made thrust sliding bearing in accordance with the present invention, the upper annular flat plate-shaped portion has a circular hole in a central portion thereof, and the lower annular flat plate-shaped portion has in a central portion thereof a circular hole communicating with the circular hole of the upper annular flat plate-shaped portion, wherein the upper casing has a first cylindrical suspended portion formed integrally on the lower surface of the upper annular flat plate-shaped portion and having an inside diameter identical to that of the circular hole of the upper annular flat plate-shaped portion, a second cylindrical suspended portion formed integrally on the lower surface of the upper annular flat plate-shaped portion in such a manner as to be radially outwardly spaced apart a predetermined interval from the first cylindrical suspended portion, so as to form an upper inner annular groove in cooperation with an outer peripheral surface of the first cylindrical suspended portion, a third cylindrical suspended portion formed integrally on the lower surface of the upper annular flat plate-shaped portion in such a manner as to be radially outwardly spaced apart a predetermined interval from the second cylindrical suspended portion, so as to form an upper annular recess in cooperation with the second cylindrical suspended portion and the lower surface of the upper annular flat plate-shaped portion, a fourth cylindrical suspended portion formed integrally on an outer peripheral edge of the upper annular flat plate-shaped portion in such a manner as to be radially outwardly spaced apart a predetermined interval from the third cylindrical suspended portion, so as to form an upper outer annular groove in cooperation with the third cylindrical suspended portion, and an annular engaging portion formed on an inner peripheral surface of an end portion of the fourth cylindrical suspended portion, and wherein the lower casing has a third annular projection formed integrally on the upper surface of the lower annular flat plate-shaped portion in such a manner as to be radially outwardly spaced apart from the circular hole of the lower annular flat plate-shaped portion via an annular shoulder portion, a fourth annular projection formed integrally on an outer peripheral edge of the lower annular flat plate-shaped portion in such a manner as to be radially outwardly spaced apart a predetermined interval from the second annular projection, so as to form a lower outer annular groove in cooperation with the second annular projection, and an annular engaged portion formed on an outer peripheral surface of an end portion of the fourth annular projection, the first annular projection being formed integrally on the upper surface of the lower annular flat plate-shaped portion in such a manner as to be radially outwardly spaced apart a predetermined interval from the third annular projection, so as to form a lower inner annular groove in cooperation with the third annular projection, the second annular projection being formed integrally on the upper surface of the lower annular flat plate-shaped portion in such a manner as to be radially outwardly spaced apart a predetermined interval from the first annular projection, so as to form the lower annular recess in cooperation with the first annular projection and the upper surface of the lower annular flat plate-shaped portion, the upper casing being combined with the lower casing by causing the first cylindrical suspended portion to face the annular shoulder portion of the lower casing so as to be radially superposed on an end portion of the third annular projection, by disposing an end portion of the second cylindrical suspended portion in the lower inner annular groove so as to be radially superposed on the first annular projection and the third annular projection, respectively, by disposing an end portion of the third cylindrical suspended portion in the lower outer annular groove so as to be radially superposed on the second annular projection and the fourth annular projection, respectively, and by causing the annular engaging portion to be resiliently fitted to the annular engaged portion.

Also in the above-described example of the synthetic resin-made thrust sliding bearing, sealed portions based on labyrinth action are formed at superposed portions of the first cylindrical suspended portion and the third annular projection, at superposed portions of, on the one hand, the second cylindrical suspended portion and, on the other hand, the first annular projection and the third annular projection, at superposed portions of, on the one hand, the third cylindrical suspended portion and, on the other hand, the second annular projection and the fourth annular projection, and at resiliently fitting portions of the annular engaging portion and the annular engaged portion, respectively. As a result, it is possible to prevent the entry of foreign objects such as dust onto sliding interfaces between the upper casing and the lower casing and, hence, between, on the one hand, the upper casing and the lower casing and, on the other hand, the thrust sliding bearing piece interposed between the upper casing and the lower casing, so that smooth sliding is effected constantly.

Also in the above-described example of the synthetic resin-made thrust sliding bearing, the following construction may be provided. An inner peripheral surface of the thrust sliding bearing piece defining a circular hole in a central portion thereof has an inside diameter larger than an outside diameter of the first annular projection, and an outer peripheral surface of the thrust sliding bearing piece has an outside diameter smaller than an inside diameter of the second annular projection, and wherein the thrust sliding bearing piece is disposed in the lower annular recess with annular clearances provided respectively between the inner peripheral surface defining the circular hole thereof and an outer peripheral surface of the first annular projection and between that outer peripheral surface and an inner peripheral surface of the second annular projection, the lubricating grease, preferably the above-described silicone grease, being filled and held in each of the annular clearances, the lower inner annular groove, and the lower outer annular groove.

Also in this example of the synthetic resin-made thrust sliding bearing, since the thrust sliding bearing piece is formed of a polyethylene resin whose density is 0.925 to 0.970 g/cm$^3$ and whose melt flow rate (190° C., 2160 g) defined by ISO 1133 (corresponding to JIS K 7210 or ASTM D 1238) is 0.1 to 20 g/10 min, low friction characteristics are exhibited between the synthetic resin-made upper casing and lower casing between which the thrust sliding bearing piece is interposed. Additionally, since the lubricating grease, preferably the above-described silicone grease, is constantly supplied to the sliding interface between the lower surface of the thrust sliding bearing piece and the upper surface of the lower annular flat plate-shaped portion defining the bottom surface of the lower annular recess of the lower casing, enhanced low friction characteristics are exhibited by virtue of the synergistic effect derived from the low friction characteristics of the thrust sliding bearing piece itself and the low friction characteristics of the lubricating grease to thereby enable smooth sliding over extended periods of time without the occurrence of the stick-slip phenomenon at the sliding surfaces, so that abnormal frictional noise attributable to the stick-slip phenomenon is not generated. In addition, since the lubricating grease is filled and held in each of the lower inner annular groove and the lower outer annular groove, foreign objects such as dust which entered from the resiliently fitting portions of the annular engaging portion and the annular engaged portion or the labyrinth portion on the inside diameter side are captured by the lubricating grease filled and held in the lower inner annular groove and the lower outer annular groove, and are thereby prevented from entering the sliding interface. Hence, a dual prevention effect is exhibited with respect to the entry of foreign objects such as dust on the inside diameter side and the outside diameter side by virtue of the sealed portions based on the labyrinth action.

In the synthetic resin-made thrust sliding bearing in accordance with the present invention, the thrust sliding bearing piece may have on each of the upper and lower surfaces thereof an annular groove which surrounds the circular hole and a plurality of radial grooves formed along the circumferential direction and each having one end open at the annular groove and the other end open at the outer peripheral surface. Further, the lower casing may have a cylindrical portion formed integrally on its lower surface and having an inside diameter identical to the diameter of the circular hole of the lower annular flat plate-shaped portion.

According to the synthetic resin-made thrust sliding bearing having a cylindrical portion formed integrally on the lower surface of the lower casing and having an inside diameter identical to that of the circular hole, when the thrust sliding bearing is mounted to the upper spring seat, mounting can be performed by inserting the cylindrical portion into a mounting hole formed in the upper spring seat, so that the efficiency in its mounting operation is remarkably facilitated.

In another aspect of the synthetic resin-made thrust sliding bearing in accordance with the present invention, the following construction may be provided. If it is assumed that a radial length from the axis of the upper casing to the outer peripheral surface of the thrust sliding bearing piece disposed in the lower annular recess is r, and that a thickness of the upper annular flat plate-shaped portion at its inner peripheral surface defining the circular hole is t, the upper casing has, on its upper surface, an annular flat surface having a circular outer peripheral edge whose radius (R) with the axis of the upper casing set as a center is in a range of R=r±t.

According to the synthetic resin-made thrust sliding bearing in the above-described aspect, since the upper casing has on its upper surface an annular flat surface which satisfies the above-described relational expression, the synthetic resin-made thrust sliding bearing can be disposed such that the upper surface of the upper casing is brought into contact with the lower surface of a vehicle body-side mounting member only at its annular flat surface, while, at its other portions, maintaining a space with respect to the lower surface of the vehicle body-side mounting member. Therefore, even in the case where a fluctuating load such as an inclination has acted on the vehicle body-side mounting member, it is possible to avoid abnormal interference between the upper casing and the lower casing. Hence, an operational effect is added in that problems such as deformation, damage, breakage, and the like do not occur in the upper casing and the lower casing.

In the case of an annular flat surface having a circular outer peripheral edge of a length smaller than the length of R=r−t in the above-described expression, an excess load will be applied to the thrust sliding bearing piece in the synthetic resin-made thrust sliding bearing, so that a creep or the like can occur in the thrust sliding bearing piece, causing a decline in low friction characteristics and wear resistance. On the other hand, in the case of an annular flat surface having a circular outer peripheral edge of a length greater than the length of R=r+t, in the case where a fluctuating load such as an inclination has acted on the vehicle body-side mounting member, abnormal interference can possibly occur between the upper casing and the lower casing, so that problems such as deformation, damage, breakage, and the like can possibly occur in the upper casing and the lower casing. Therefore, the annular flat surface which is formed on the upper surface of the upper casing preferably has a circular outer peripheral edge whose radius (R) with the axis of the upper casing set as a center is in a range of R=r±t, more preferably a circular outer peripheral edge whose radius (R) is in a range of R=r.

The upper casing may further have an annular projecting portion which integrally projects axially from the upper surface of the upper annular flat plate-shaped portion, in which case the upper surface of the upper casing is an upper surface of the annular projecting portion, and the annular flat surface may be constituted by the upper surface of the annular projecting portion. Furthermore, the upper casing may have a truncated conical surface with a descending gradient which extends from an outer peripheral edge of the annular flat surface or from a portion thereof located radially outwardly of that outer peripheral edge to an outer peripheral surface thereof.

In the synthetic resin-made thrust sliding bearing in accordance with the present invention, the upper casing and the lower casing, in terms of the synthetic resin for forming them, are preferably formed of a thermoplastic synthetic resin such as polyacetal resin, polyamide resin, and polyester resin or a fiber-reinforced thermoplastic synthetic resin containing in such a thermoplastic synthetic resin reinforcing fibers such as glass fibers, carbon fibers, and aramid fibers.

Advantages of the Invention

According to the present invention, since the thrust sliding bearing piece is formed of a polyethylene resin whose density is 0.925 to 0.970 g/cm$^3$ and whose melt flow rate (190° C., 2160 g) defined by ISO 1133 (corresponding to JIS K 7210 or ASTM D 1238) is 0.1 to 20 g/10 min, the effect of inhibiting mold deposits is sufficiently exhibited on the mold surface and it is possible to obtain the effect of improving stability. In addition, in the sliding characteristics, low friction characteristics are exhibited between the synthetic resin-made upper casing and lower casing between which the thrust sliding bearing piece is interposed, and smooth sliding is effected at the sliding surfaces over extended periods of time without the occurrence of the stick-slip phenomenon, thereby making it possible to provide a synthetic resin-made thrust sliding bearing in which abnormal frictional noise attributable to the stick-slip phenomenon is not generated.

MODE FOR CARRYING OUT THE INVENTION

Figure 1:
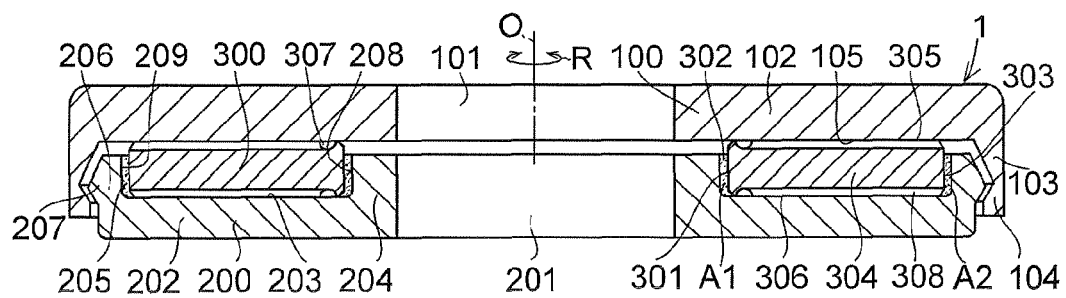
FIG. 1 is a cross-sectional view of a synthetic resin-made thrust sliding bearing in accordance with a preferred first embodiment of the invention.

Hereafter, a more detailed description will be given of the present invention with reference to preferred embodiments shown in the drawings. It should be noted that the present invention is not limited to these embodiments.

Figure 2:
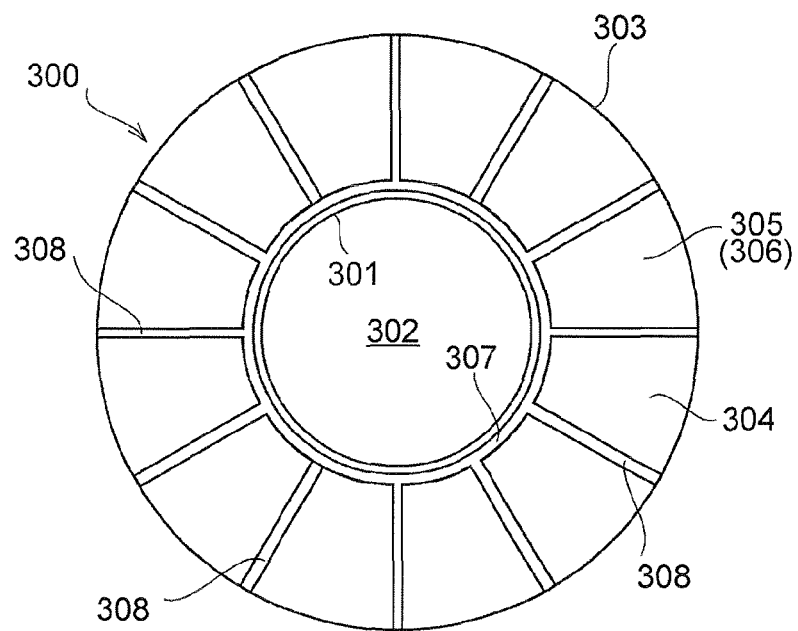
FIG. 2 is a plan view of a thrust sliding bearing piece used in the synthetic resin-made thrust sliding bearing shown in FIG. 1.

In FIGS. 1 and 2, a synthetic resin-made thrust sliding bearing 1 in accordance with a first embodiment is comprised of a synthetic resin-made upper casing 100, a synthetic resin-made lower casing 200, and a synthetic resin-made thrust sliding bearing piece 300 interposed between the upper casing 100 and the lower casing 200.

The upper casing 100 includes an upper annular flat plate-shaped portion 102 having a circular hole 101 in its central portion; a cylindrical suspended portion 103 formed integrally on an outer peripheral edge of the upper annular flat plate-shaped portion 102; and an annular engaging portion 104 formed on an inner peripheral surface of an end portion of the cylindrical suspended portion 103.

The lower casing 200 includes a lower annular flat plate-shaped portion 202 which is superposed on the upper casing 100 so as to be rotatable in a direction R about the axis O of that upper casing 100, opposes the upper annular flat plate-shaped portion 102, and has in its central portion a circular hole 201 communicating with the circular hole 101 and having the same diameter as the circular hole 101; an annular projection 204 which has an inside diameter identical to that of the circular hole 201, is formed integrally on an upper surface 203 of the lower annular flat plate-shaped portion 202, and is disposed concentrically with the lower annular flat plate-shaped portion 202; an annular projection 206 which is formed integrally on an outer peripheral edge of the lower annular flat plate-shaped portion 202 in such a manner as to be radially outwardly spaced apart a predetermined interval from the annular projection 204, forms a lower annular recess 205 in cooperation with the annular projection 204 and the upper surface 203 of the lower annular flat plate-shaped portion 202, and is disposed concentrically with the lower annular flat plate-shaped portion 202; and an annular engaged portion 207 formed on an outer peripheral surface of an end portion of the annular projection 206. The lower annular recess 205 is surrounded by the annular projection 204 and the annular projection 206.

The upper casing 100 and the lower casing 200 are formed of a thermoplastic synthetic resin such as polyacetal resin, polyamide resin, and polyester resin or a fiber-reinforced thermoplastic synthetic resin containing in such a thermoplastic synthetic resin reinforcing fibers such as glass fibers, carbon fibers, and aramid fibers.

The thrust sliding bearing piece 300, which is disposed in the lower annular recess 205 and is brought into slidable contact with the upper surface, 203 of the lower annular flat plate-shaped portion 202 defining the bottom surface of the lower annular recess 205 and a lower surface 105 of the upper annular flat plate-shaped portion 102, is constituted by a disk 304 which has in its central portion a circular hole 302 defined by an inner peripheral surface 301 having an inside diameter larger than the outside diameter of the annular projection 204 and has an outer peripheral surface 303 having an outside diameter smaller than the inside diameter of the annular projection 206. The disk 304 has on each of its upper surface 305 and lower surface 306 an annular groove 307 which surrounds the circular hole 302, as well as a plurality of radial grooves 308 each having one end open at the annular groove 307 and the other end open at the outer peripheral surface 303 and arranged at equiangular intervals in the circumferential direction.

The thrust sliding bearing piece 300 is disposed in the lower annular recess 205 while maintaining annular clearances A1 and A2 between its inner peripheral surface 301 and an outer peripheral surface 208 of the annular projection 204 and between its outer peripheral surface 303 and an inner peripheral surface 209 of the annular projection 206, respectively. Further, the thrust sliding bearing piece 300 is disposed between the upper casing 100 and the lower casing 200 such that its upper surface 305 is positioned above the opening of the lower annular recess 205 and is brought into slidable contact with the lower surface 105 of the upper annular flat plate-shaped portion 102, while its lower surface 306 is brought into slidable contact with the upper surface 203 of the lower annular flat plate-shaped portion 202 defining the bottom surface of the lower annular recess 205.

The thrust sliding bearing piece 300 is formed of a polyethylene resin whose density is 0.925 to 0.970 g/cm$^3$, preferably 0.930 to 0.970 g/cm$^3$, and whose melt flow rate (190° C., 2160 g) defined by ISO 1133 (corresponding to JIS K 7210 or ASTM D 1238) is 0.1 to 20 g/10 min, preferably 0.1 to 15 g/10 min, and more preferably 0.1 to 10 g/10 min. By using a polyethylene resin having such a melt viscosity, the effect of inhibiting mold deposits is sufficiently exhibited in the molding process and it is possible to obtain the effect of improving stability. In addition, in the sliding characteristics, in cases where the mating member is a synthetic resin, low friction characteristics are exhibited, smooth sliding is effected over extended periods of time without the occurrence of the stick-slip phenomenon, and abnormal frictional noise attributable to the stick-slip phenomenon is not generated.

The upper casing 100 is combined with the lower casing 200 by causing the annular engaging portion 104 on the inner peripheral surface of the end portion of the cylindrical suspended portion 103 at its outer peripheral edge to be resiliently fitted to the annular engaged portion 207 on the outer peripheral surface of the end portion of the annular projection 206 at the outer peripheral edge of the lower casing 200.

In the synthetic resin-made thrust sliding bearing 1, a lubricating grease, preferably a silicone grease whose base oil is a silicone oil and which contains a thickener, is interposed at sliding interfaces between, on the one hand, the lower surface 105 of the upper annular flat plate-shaped portion 102 and the upper surface 203 of the lower annular flat plate-shaped portion 202 defining the bottom surface of the lower annular recess 205, and, on the other hand, the upper surface 305 and the lower surface 306, which are respectively brought into slidable contact therewith, of the thrust sliding bearing piece 300 disposed in the lower annular recess 205.

The silicone oil for forming the base oil is selected from straight silicone oils such as dimethyl silicone oil and methylphenyl silicone oil, or modified silicone oils containing an alkyl group, an aminopropyl group, a polyether group, a fluoro group, and a straight silicone oil, in particular, is suitably used.

As the thickener which is contained in the base oil, at least one kind of the following is used: soap-based thickeners such as lithium soap, sodium soap, aluminum soap, calcium soap, and barium soap; compound soap-based thickeners such as a lithium complex, an aluminum complex, a calcium complex, and a barium complex; urea-based thickeners such as aliphatic diurea, alicyclic diurea, aromatic diurea, triurea, and polyurea; organic thickeners such as sodium terephthalate, polytetrafluoroethylene (PTFE), and melamine cyanurate (MCA); and inorganic thickeners such as bentonite, silica, graphite, molybdenum disulfide, and carbon black. Among others, lithium soap such as lithium stearate and lithium hydroxy stearate [lithium 12-hydroxystearate: 12(OH)StLi], polytetrafluoroethylene resin (PTFE), melamine cyanurate, molybdenum disulfide, and the like are preferably used.

The compounding ratio of the thickener is determined such that the mixture consistency (measured in accordance with ISO 2137 (corresponding to JIS K 2220 5.3)) of the resultant grease becomes not less than 200 and not more than 400, preferably not less than 250 and not more than 350. Specifically, the thickener is preferably contained in the base oil at a ratio of not less than 3% by mass and not more than 50% by mass. At a compounding ratio of less than 3% by mass with respect to the base oil, the mixture consistency is low and such a grease is difficult to use, whereas if the thickener is compounded in excess of 50% by mass, the mixture consistency of the resultant grease is large and such a grease is too hard, with the result that the torque becomes large, and such a grease is not preferable in practical use.

The above-described silicone grease which is suitably used for the synthetic resin-made thrust sliding bearing 1 of the present invention may contain various additives, as desired, to improve various characteristics. For example, the additives include antioxidants including amine compounds such as phenyl-1-naphthylamine, 2,6-t-butylphenol-based compounds, sulfur compounds, and zinc dithiophosphate-based compounds; rust inhibitors including organic sulfonates of alkali metals or alkali earth metals, alkyl- or alkenylsuccinic acid derivatives such as alkyl- or alkenylsuccinic acid esters, and partial esters of polyalcohols such as sorbitan monooleate; and oiliness agents such as fatty acids and animal and plant oils. The compounding ratio of these additives is 0.1 to 1% by mass or thereabouts.

Here, a description will be given of the compositions of silicone grease which is suitably used in the synthetic resin-made thrust sliding bearing 1 of the present invention.

(1) A silicone grease in which 15 wt. % of a molybdenum disulfide (MoS$_2$) powder and 25 wt. % of a PTFE powder are added as thickeners to 60 wt. % of methylphenyl silicone oil as a base oil whose kinetic viscosity at 25° C. exhibits 450 cSt (450 mm$^2$/s), and a mixture consistency obtained by uniformly kneading them is set to 275.

(2) A silicone grease in which 25 wt. % of melamine cyanurate (MCA) and 10 wt. % of a PTFE powder are added as thickeners to 65 wt. % of dimethyl silicone oil as a base oil whose kinetic viscosity at 25° C. exhibits 500 cSt (500 mm²/s), and a mixture consistency obtained by uniformly kneading them is set to 270.

(3) A silicone grease in which 26 wt. % of lithium hydroxy stearate (lithium 12-hydroxystearate: 12(OH)StLi) is added as a thickener to 74 wt. % of methylphenyl silicone oil as a base oil whose kinetic viscosity at 25° C. exhibits 3,000 cSt (3,000 mm²/s), heating and mixing are conducted for 2 hours at a temperature of 185° C., followed by cooling, and a mixture consistency obtained by uniformly kneading them is set to 279.

(4) A silicone grease in which 40 wt. % of a PTFE powder is added as a thickener to 60 wt. % of dimethyl silicone oil as a base oil whose kinetic viscosity at 25° C. exhibits 6,500 cSt (6,500 mm²/s), and a mixture consistency obtained by uniformly kneading them is set to 250.

(5) A silicone grease in which 12 wt. % of lithium hydroxy stearate (lithium 12-hydroxystearate: 12(OH)StLi) is added as a thickener to 88 wt. % of methylphenyl silicone oil as a base oil whose kinetic viscosity at 25° C. exhibits 45,000 cSt (11,000 mm²/s), heating and mixing are conducted for 2 hours at a temperature of 185° C., followed by cooling, and a mixture consistency obtained by uniformly kneading them is set to 358.

(6) A silicone grease in which 10% by mass of a fine silica powder is added as a thickener to 90% by mass of dimethyl silicone oil as a base oil whose kinetic viscosity at 25° C. exhibits 200,000 cSt (200,000 mm²/s), and a mixture consistency obtained by uniformly kneading them is set to 335.

Each of these silicone greases (1) to (6) was applied to the sliding interfaces of the thrust sliding bearing 1 shown in FIG. 1, i.e., the sliding interfaces between, on the one hand, the upper casing 100 and the lower casing 200 and, on the other hand, the thrust sliding bearing piece 300 interposed between the upper casing 100 and the lower casing 200. The lower casing 200 was fixed, a load of 4.5 kN was applied from the upper surface side of the upper casing 100, and a 50-cycle swinging motion was performed at a swinging velocity of 0.5 Hz and at a swinging angle of ±40°. The torque (Nm) at that time was measured, and a test was conducted on the presence or absence of the stick-slip phenomenon and the presence or absence of the occurrence of abnormal frictional noise. The test results are shown in Tables 1 and 2. It should be noted that the upper casing 100 and the lower casing 200 of the synthetic resin-made thrust sliding bearing 1 used in the test were formed of a polyacetal resin, and the thrust sliding bearing piece 300 was fabricated of (A) a polyethylene resin constituted by "Novatec HD HB424R (tradename)" made by Japan Polyethylene Corporation and exhibiting a density of 0.957 g/cm³ and a melt flow rate of 0.25 g/10 min and (B) a polyethylene resin constituted by "Novatec HJ560 (tradename)" made by Japan Polyethylene Corporation and exhibiting a density of 0.964 g/cm³ and a melt flow rate of 7 g/10 min.

TABLE 1

| | Silicone Grease Composition | | |
|---|---|---|---|
| | (1) | (2) | (3) |
| Base oil | Methylphenyl | Dimethyl | Methylphenyl |
| Kinetic viscosity (25° C.) | 450 | 500 | 3,000 |
| Thickener | MoS₂ PTFE | MCA PTFE | 12(OH)StLi |
| Mixture consistency | 275 | 270 | 279 |
| Resin material of upper and lower casings | | Polyacetal resin | |

TABLE 1-continued

| | Silicone Grease Composition | | | | | |
|---|---|---|---|---|---|---|
| | (1) | | (2) | | (3) | |
| Resin material of thrust sliding bearing piece | (A) | (B) | (A) | (B) | (A) | (B) |
| Torque (Nm) | 3.30 | 3.34 | 3.25 | 3.28 | 1.96 | 1.95 |
| Presence or absence of occurrence of abnormal frictional noise | none | none | none | none | none | none |

TABLE 2

| | Silicone Grease Composition | | |
|---|---|---|---|
| | (4) | (5) | (6) |
| Base oil | Dimethyl | Methylphenyl | Methylphenyl |
| Kinetic viscosity (25° C.) | 6,500 | 45,000 | 200,000 |
| Thickener | PTFE | 12(OH)StLi | silica |
| Mixture consistency | 250 | 358 | 335 |
| Resin material of upper and lower casings | | Polyacetal resin | |
| Resin material of thrust sliding bearing piece | (A) (B) | (A) (B) | (A) (B) |
| Torque (Nm) | 1.53 1.56 | 1.42 1.41 | 1.38 1.36 |
| Presence or absence of occurrence of abnormal frictional noise | none none | none none | none none |

A silicone grease exemplified by the silicone grease compositions (1) to (6) above is interposed at the sliding interfaces between, on the one hand, the lower surface 105 of the upper annular flat plate-shaped portion 102 of the upper casing 100 and the upper surface 203 of the lower annular flat plate-shaped portion 202 defining the bottom surface of the lower annular recess 205, and, on the other hand, the upper surface 305 and the lower surface 306, which are respectively brought into slidable contact therewith, of the thrust sliding bearing piece 300 disposed in the lower annular recess 205 of the lower casing 200. In consequence, low friction characteristics are exhibited by virtue of the synergistic effect derived from the low friction characteristics of the thrust sliding bearing piece 300 itself and the low friction characteristics of the silicone grease to enable smooth sliding over extended periods of time without the occurrence of the stick-slip phenomenon at the sliding surfaces, so that abnormal frictional noise attributable to the stick-slip phenomenon is not generated. In particular, the torque displayed a gradually decreasing trend at a high viscosity in which the dynamic viscosity at 25° C. of the silicone oil of the base oil exceeds 1,000 cSt. In addition, as the silicone grease is filled and held in the annular clearances A1 and A2, the silicone grease is constantly supplied to the sliding interface between the lower surface 306 of the thrust sliding bearing piece 300 and the upper surface 203 of the lower annular flat plate-shaped portion 202 defining the bottom surface of the lower annular recess 205, so that low friction characteristics are exhibited over extended periods of time to enable smooth sliding.

In the synthetic resin-made thrust sliding bearing 1, as shown in FIG. 2, the thrust sliding bearing piece 300 should preferably have on each of its upper surface 305 and lower surface 306 an annular groove 307 which surrounds the circular hole 302, as well as a plurality of radial grooves 308 each having one end open at the annular groove 307 and the other end open at the outer peripheral surface 303 and arranged at equiangular intervals in the circumferential direction. The aforementioned silicone grease is filled and held in the annular groove 307 and the radial grooves 308.

Figure 3:
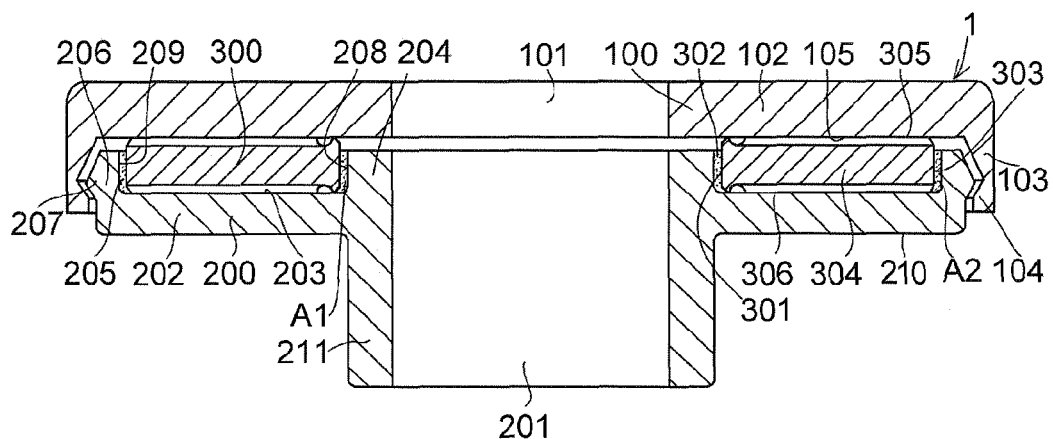
FIG. 3 is a cross-sectional view of the synthetic resin-made thrust sliding bearing in accordance with a preferred second embodiment of the invention.

The synthetic resin-made thrust sliding bearing 1 in accordance with a second embodiment shown in FIG. 3 has, in addition to the construction of the synthetic resin-made thrust sliding bearing 1 in accordance with the above-described first embodiment, a cylindrical portion 211 which has an inside diameter identical to that of the circular hole 201 and is formed integrally with a lower surface 210 of the lower annular flat plate-shaped portion 202.

Figure 6:
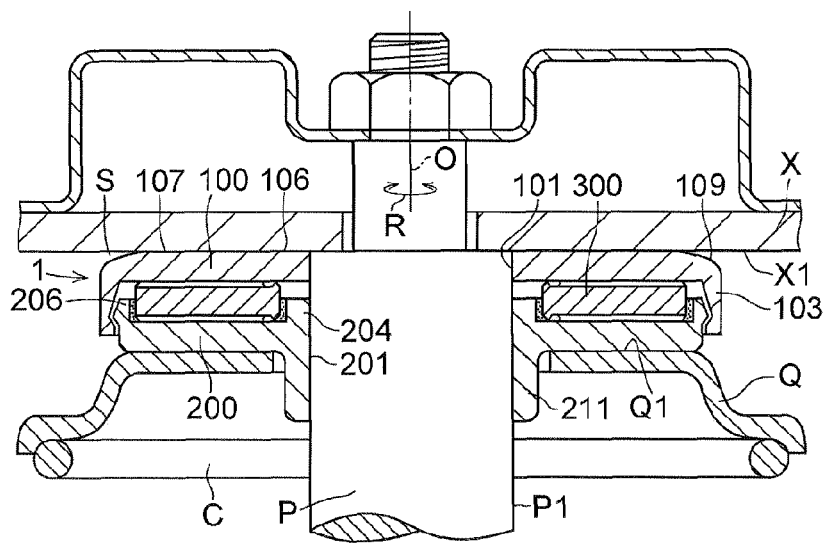
FIG. 6 is a cross-sectional view of an example in which the synthetic resin-made thrust sliding bearing shown in FIG. 4 is incorporated in a strut-type suspension.

With the synthetic resin-made thrust sliding bearing 1 in accordance with the second embodiment having the cylindrical portion 211 on the lower surface 210 of the lower annular flat plate-shaped portion 202, when it is installed between an upper spring seat Q of a coil spring C and a mounting member X to which a piston rod P of a hydraulic damper is secured in a strut-type suspension assembly shown in FIG. 6, the positioning is facilitated, and its installation is facilitated.

In this case, an upper portion of the piston rod P is inserted into the circular hole 101 of the upper casing 100 and the circular hole 201 of the lower casing 200 in the synthetic resin-made thrust sliding bearing 1 such as to be swingingly rotatable about an axis O in a direction R with respect to the upper casing 100 and the lower casing 200.

Figure 4:
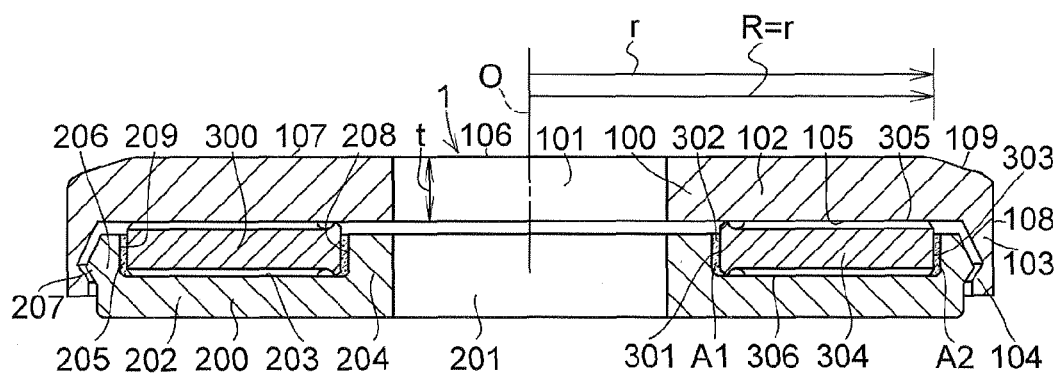
FIG. 4 is a cross-sectional view of the synthetic resin-made thrust sliding bearing in accordance with a modification in the synthetic resin-made thrust sliding bearing shown in FIG. 1.
Figure 5:
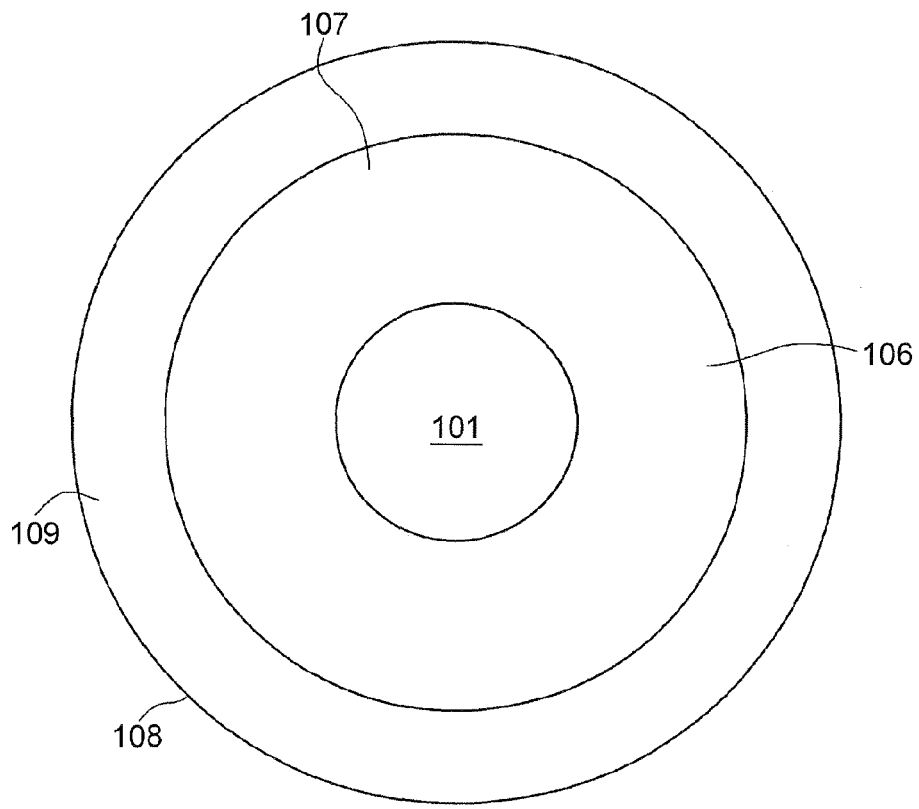
FIG. 5 is a plan view of an upper casing of the synthetic resin-made thrust sliding bearing shown in FIG. 4.

With the thrust sliding bearing 1 in accordance with the first or second embodiment, if it is assumed that, as shown in FIGS. 4 and 5, the radial length from the axis O of the upper casing 100 to the outer peripheral surface 303 of the thrust sliding bearing piece 300 disposed in the lower annular recess 205 is r, and that the thickness of the upper annular flat plate-shaped portion 102 at its inner peripheral surface defining the circular hole 101 is t, the upper casing 100 may have, on an upper surface 106 of the upper annular flat plate-shaped portion 102 constituting its upper surface, an annular flat surface 107 having a circular outer peripheral edge whose radius R with the axis O of the upper casing 100 set as a center is in a range of R=r±t, as well as a truncated conical surface portion 109 with a descending gradient which extends continuously from an outer peripheral edge of the annular flat surface 107 or from a portion thereof located radially outwardly of that outer peripheral edge to its outer peripheral surface 108.

In this modification, as shown in FIGS. 4 and 5, the upper casing 100 has, on the upper surface 106 of the upper annular flat plate-shaped portion 102 constituting its upper surface, the annular flat surface 107 having an outer peripheral edge whose radius R with the axis O of the upper casing 100 set as a center is R=r.

This synthetic resin-made thrust sliding bearing 1 is disposed between the upper spring seat Q of the coil spring C and the mounting member X to which the piston rod P of a hydraulic damper is secured in the strut-type suspension assembly shown in FIG. 6. Namely, the synthetic resin-made thrust sliding bearing 1 is disposed between a lower surface X1 of the vehicle body-side mounting member X and an upper surface Q1 of the upper spring seat Q opposing that lower surface X1, such that only the annular flat surface 107 of the upper surface 106 of the upper annular flat plate-shaped portion 102 is brought into contact with the lower surface X1 of the vehicle body-side mounting member X, while, at its other portions, maintaining a space S with respect to the lower surface X1 of the vehicle body-side mounting member X. Therefore, even in the case where a fluctuating load such as an inclination has acted on the vehicle body-side mounting member X, interference does not occur at radially superposed portions of the cylindrical suspended portion 103 and the annular projection 206, as well as at resiliently fitting portions of the annular engaging portion 104 and the annular engaged portion 207. Hence, an operational effect is added in that problems such as deformation, damage, breakage, and the like do not occur in these superposed portions and resiliently fitting portions.

Figure 7:
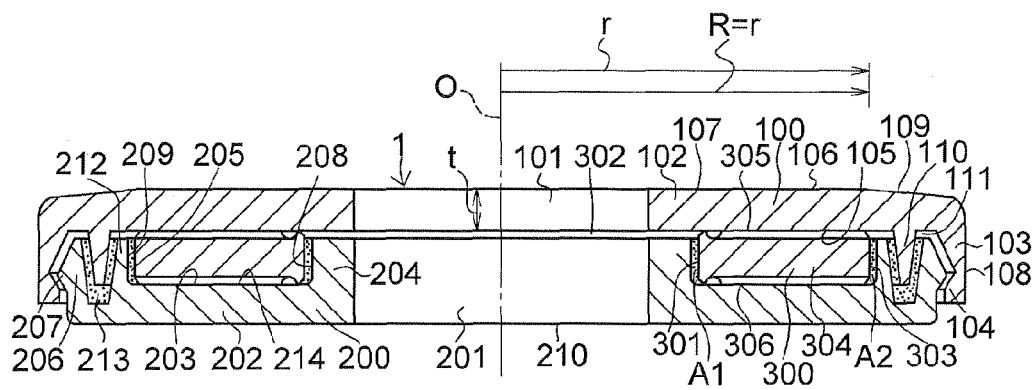
FIG. 7 is a cross-sectional view of the synthetic resin-made thrust sliding bearing in accordance with a preferred third embodiment of the invention.

The synthetic resin-made thrust sliding bearing 1 in accordance with a third embodiment shown in FIG. 7 is comprised of the synthetic resin-made upper casing 100, the synthetic resin-made lower casing 200, and the synthetic resin-made thrust sliding bearing piece 300 interposed between the upper casing 100 and the lower casing 200.

The upper casing 100 includes the upper annular flat plate-shaped portion 102 having the circular hole 101 in its central portion; a cylindrical suspended portion 110 formed integrally on the lower surface 105 of the upper annular flat plate-shaped portion 102 in such a manner as to be radially outwardly spaced apart a predetermined interval from the peripheral edge of the circular hole 101; the cylindrical suspended portion 103 formed integrally on the outer peripheral edge of the upper annular flat plate-shaped portion 102 in such a manner as to be radially outwardly spaced apart a predetermined interval from the cylindrical suspended portion 110, so as to form an upper outer annular groove 111 in cooperation with the cylindrical suspended portion 110; and the annular engaging portion 104 formed on the inner peripheral surface of the end portion of the cylindrical suspended portion 103.

The lower casing 200 includes the lower annular flat plate-shaped portion 202 having in its central portion the circular hole 201 communicating with the circular hole 101; the annular projection 204 having an inside diameter identical to that of the circular hole 201 and formed integrally on the upper surface 203 of the lower annular flat plate-shaped portion 202; an annular projection 212 formed integrally on the upper surface 203 of the lower annular flat plate-shaped portion 202 in such a manner as to be radially outwardly spaced apart a predetermined interval from the annular projection 204, so as to form the lower annular recess 205 in cooperation with the annular projection 204 and the upper surface 203 of the lower annular flat plate-shaped portion 202; the annular projection 206 formed integrally on the outer peripheral edge of the lower annular flat plate-shaped portion 202 in such a manner as to be radially outwardly spaced apart a predetermined interval from the annular projection 212, so as to form a lower outer annular groove 213 in cooperation with the annular projection 212; and the annular engaged portion 207 formed on the outer peripheral surface of the end portion of the annular projection 206.

The thrust sliding bearing piece 300 is constituted by the disk 304 which has the circular hole 302 defined by the inner peripheral surface 301 having an inside diameter larger than the outside diameter of the annular projection 204 of the lower casing 200 and has the outer peripheral surface 303 having an outside diameter smaller than the inside diameter of the annular projection 212. The thrust sliding bearing piece 300 is disposed in the lower annular recess 205 while maintaining the annular clearance A1 between its inner peripheral surface 301 defining the circular hole 302 and the outer peripheral surface 208 of the annular projection 204 and the annular clearance A2 between its outer peripheral surface 303 and the inner peripheral surface 209 of the annular projection 212. Further, the thrust sliding bearing piece 300 is disposed between the upper casing 100 and the lower casing 200 such that its upper surface 305 is positioned above the opening of the lower annular recess 205 of the lower casing 200 and is brought into slidable contact with the lower surface 105 of the upper annular flat plate-shaped portion 102, while its lower surface 306 is brought into slidable contact with the upper surface 203 of the lower annular flat plate-shaped portion 202 defining the bottom surface 214 of the lower annular recess 205.

The upper casing 100 is combined with the lower casing 200 by disposing the end portion of the cylindrical suspended portion 110 in the lower outer annular groove 213 so as to be radially superposed on the end portions of the annular projection 212 and the annular projection 206, respectively, and by causing the annular engaging portion 104 to be resiliently fitted to the annular engaged portion 207.

In the synthetic resin-made thrust sliding bearing 1 in accordance with the third embodiment, the thrust sliding bearing piece 300, which is disposed in the lower annular recess 205 and is brought into slidable contact with the lower surface 105 of the upper annular flat plate-shaped portion 102 and the upper surface 203 of the lower annular flat plate-shaped portion 202 defining the bottom surface 214 of the lower annular recess 205, respectively, is formed of a polyethylene resin whose density is 0.925 to 0.970 g/cm$^3$, preferably 0.930 to 0.970 g/cm$^3$, and whose melt flow rate (190° C., 2160 g) defined by ISO 1133 (corresponding to JIS K 7210 or ASTM D 1238) is 0.1 to 20 g/10 min, preferably 0.1 to 15 g/10 min. Further, a lubricating grease, preferably a silicone grease whose base oil is a silicone oil, whose kinetic viscosity at 25° C. is not less than 100 cSt and not more than 500,000 cSt, preferably not less than 1,000 cSt and not more than 100,000 cSt, and which contains a thickener so as to set its mixture consistency to not less than 200 and not more than 400, preferably not less than 250 and not more than 350, is interposed at sliding interfaces between, on the one hand, the upper surface 305 and the lower surface 306 of the thrust sliding bearing piece 300 formed of the aforementioned polyethylene resin and, on the other hand, the lower surface 105 of the upper annular flat plate-shaped portion 102 and the upper surface 203 of the lower annular flat plate-shaped portion 202. Also, the silicone grease is filled and held in each of the annular clearances A1 and A2 and the lower outer annular groove 213.

The aforementioned silicone grease is thus interposed at the sliding interfaces between, on the one hand, the lower surface 105 of the upper annular flat plate-shaped portion 102 and the upper surface 203 of the lower annular flat plate-shaped portion 202 defining the bottom surface 214 of the lower annular recess 205, and, on the other hand, the upper surface 305 and the lower surface 306, which are respectively brought into slidable contact with the lower surface 105 and the upper surface 203, of the thrust sliding bearing piece 300 disposed in the lower annular recess 205 and formed of the aforementioned specific polyethylene resin. In consequence, enhanced low friction characteristics are exhibited by virtue of the synergistic effect derived from the low friction characteristics of the thrust sliding bearing piece 300 itself and the low friction characteristics of the silicone grease, and the stick-slip phenomenon does not occur during sliding, so that abnormal frictional noise attributable to the stick-slip phenomenon is not generated. In addition, as the aforementioned silicone grease is filled and held in the annular clearances A1 and A2, the silicone grease is constantly supplied to the sliding interface between the lower surface 306 of the thrust sliding bearing piece 300 and the upper surface 203 of the lower annular flat plate-shaped portion 202 defining the bottom surface 214 of the lower annular recess 205, so that low friction characteristics are exhibited over extended periods of time to enable smooth sliding without the occurrence of such as depletion of the silicone grease between the sliding surfaces.

In the synthetic resin-made thrust sliding bearing 1 in accordance with the third embodiment, the upper casing 100 is combined with the lower casing 200 by disposing the end portion of the cylindrical suspended portion 110 in the lower outer annular groove 213 so as to be radially superposed on the end portions of the annular projections 212 and 206, respectively, and by causing the annular engaging portion 104 to be resiliently fitted to the annular engaged portion 207. In consequence, sealed portions based on labyrinth action are formed at the superposed portions of the cylindrical suspended portion 110 and the annular projections 212 and 206 and at the resiliently fitting portions of the annular engaging portion 104 and the annular engaged portion 207. In addition, silicone grease is filled and held in the lower outer annular groove 213 formed on the outer diameter side of the lower casing 200. Therefore, foreign objects such as dust which entered from the resiliently fitting portions of the annular engaging portion 104 and the annular engaged portion 207 are captured by the silicone grease filled and held in that lower outer annular groove 213, and are thereby prevented from entering the sliding interface. Hence, a dual entry prevention effect is exhibited with respect to the entry of foreign objects such as dust by virtue of the sealed portions based on the labyrinth action.

Also with the synthetic resin-made thrust sliding bearing 1 in accordance with the third embodiment, the thrust sliding bearing piece 300 is similar to the thrust sliding bearing piece 300 of the synthetic resin-made thrust sliding bearing 1 in accordance with the above-described first embodiment and, as shown in FIG. 2, should preferably have, on each of its upper surface 305 and lower surface 306 of the thrust sliding bearing piece 300 constituted by the disk 304, the annular groove 307 which surrounds the circular hole 302, as well as the radial grooves 308 each having one end open at the annular groove 307 and the other end open at the outer peripheral surface 303 of the thrust sliding bearing piece 300 constituted by the disk 304 and arranged at equiangular intervals in the circumferential direction. A lubricating grease, preferably the aforementioned silicone grease, is filled and held in the annular groove 307 and the radial grooves 308.

With the synthetic resin-made thrust sliding bearing 1 in accordance with the third embodiment, as for the upper casing 100 and the lower casing 200, in the same way as the upper casing 100 and the lower casing 200 of the synthetic resin-made thrust sliding bearing 1 in accordance with the above-described first embodiment, a thermoplastic synthetic resin such as polyacetal resin, polyamide resin, and polyester resin or a fiber-reinforced thermoplastic synthetic resin containing in such a thermoplastic synthetic resin reinforcing fibers such as glass fibers, carbon fibers, and aramid fibers is suitably used.

Also with the synthetic resin-made thrust sliding bearing 1 in accordance with the third embodiment, if it is assumed that the radial length from the axis O of the upper casing 100 to the outer peripheral surface 303 of the thrust sliding bearing piece 300 disposed in the lower annular recess 205 is r, and that the thickness of the upper annular flat plate-shaped portion 102 at its inner peripheral surface defining the circular hole 101 is t, the upper casing 100 may have, on the upper surface 106 of the upper annular flat plate-shaped portion 102 constituting its upper surface, the annular flat surface 107 having a circular outer peripheral edge whose radius R with the axis O of the upper casing 100 set as a center is in a range of R=r±t, as well as the truncated conical surface portion 109 with a descending gradient which extends continuously from the outer peripheral edge of the annular flat surface 107 to its outer peripheral surface 108.

Figure 8:
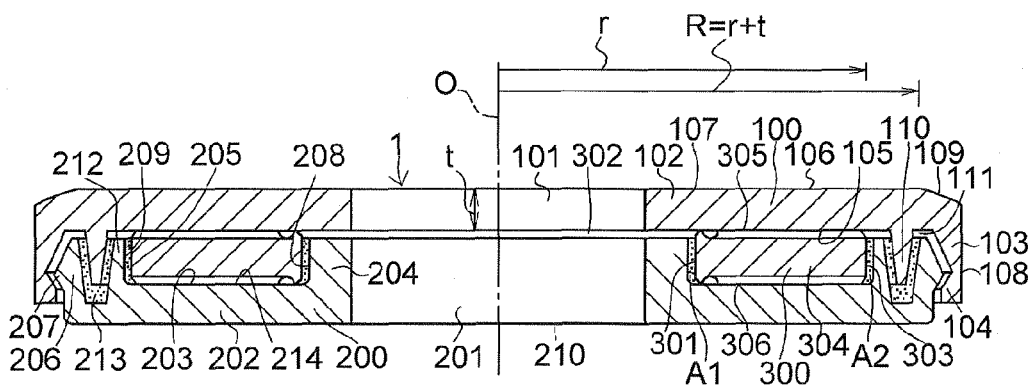
FIG. 8 is a cross-sectional view of the synthetic resin-made thrust sliding bearing in accordance with a modification in the synthetic resin-made thrust sliding bearing shown in FIG. 7.

In the synthetic resin-made thrust sliding bearing 1 in accordance with the third embodiment, FIG. 8 shows a modification in which the upper casing 100 has, on the upper surface 106 of the upper annular flat plate-shaped portion 102, the annular flat surface 107 having an outer peripheral edge whose radius R with the axis O of the upper casing 100 set as a center is R=r+t. Meanwhile, FIG. 9 shows another modification in which the upper casing 100 has, on the upper surface 106 of the upper annular flat plate-shaped portion 102, the annular flat surface 107 having an outer peripheral edge whose radius R with the axis O of the upper casing 100 set as a center is R=r−t.

Figure 9:
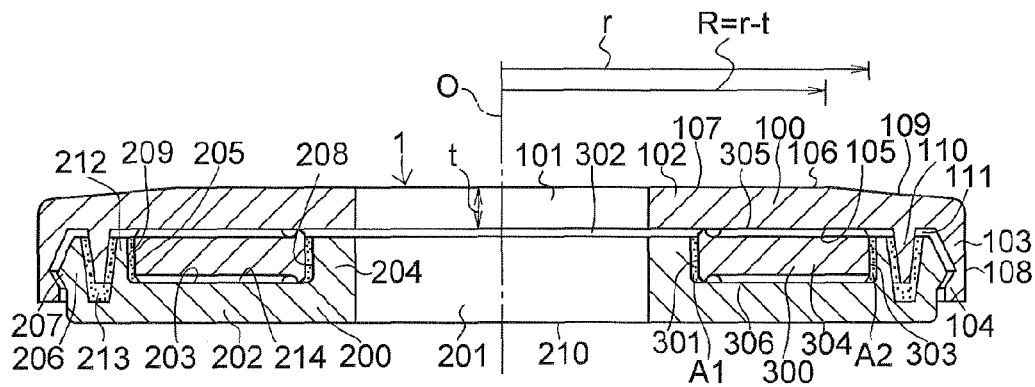
FIG. 9 is a cross-sectional view of the synthetic resin-made thrust sliding bearing in accordance with another modification in the synthetic resin-made thrust sliding bearing shown in FIG. 7.

In the same way as the synthetic resin-made thrust sliding bearing 1 in accordance with the above-described first embodiment, each of the synthetic resin-made thrust sliding bearings 1 shown in FIGS. 7 to 9 is disposed between the lower surface X1 of the vehicle body-side mounting member X and the upper surface Q1 of the upper spring seat Q opposing that lower surface X1, such that only the annular flat surface 107 of the upper surface 106 of the upper annular flat plate-shaped portion 102 is brought into contact with the lower surface X1 of the vehicle body-side mounting member X, while, at its other portions, maintaining the space S with respect to the lower surface X1 of the vehicle body-side mounting member X. Therefore, even in the case where a fluctuating load such as an inclination has acted on the vehicle body-side mounting member X, interference does not occur at radially superposed portions of the cylindrical suspended portion 110 and the annular projections 212 and 206, as well as at resiliently fitting portions of the annular engaging portion 104 of the cylindrical suspended portion 103 and the annular engaged portion 207 of the annular projection 206. Hence, an operational effect is added in that problems such as deformation, damage, breakage, and the like do not occur in these superposed portions and resiliently fitting portions.

Figure 10:
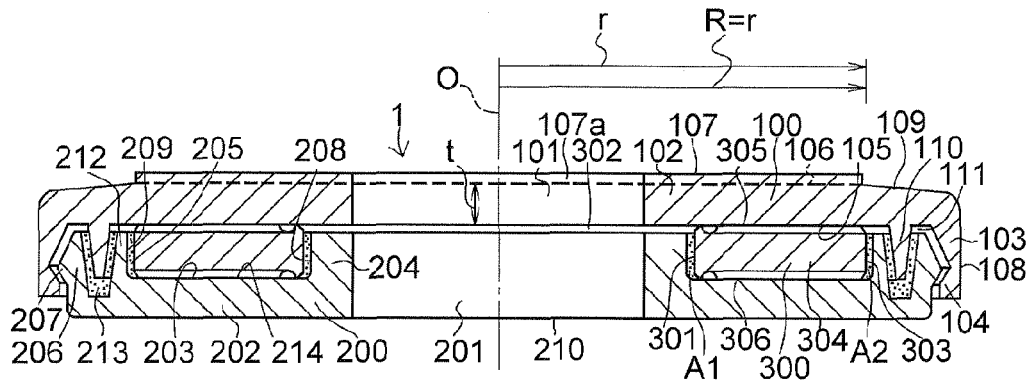
FIG. 10 is a cross-sectional view of the synthetic resin-made thrust sliding bearing in accordance with still another modification in the synthetic resin-made thrust sliding bearing shown in FIG. 7.

The synthetic resin-made thrust sliding bearing 1 shown in FIG. 10 further has, in the synthetic resin-made thrust sliding bearing 1 in accordance with the above-described third embodiment, an annular projecting portion 107a which integrally projects axially from the upper surface 106 of the upper casing 100. The upper surface of the upper casing 100 is the upper surface of the annular projecting portion 107a. The annular flat surface 107 is constituted by the upper surface of the annular projecting portion 107a, and if its length to the outer peripheral surface 303 of the thrust sliding bearing piece 300 disposed in the lower annular recess 205 is assumed to be r, the annular flat surface 107 has an outer peripheral edge whose radius R with the axis O of the upper casing 100 set as a center is R=r. The annular projecting portion 107a is continuous from its outer peripheral surface to the truncated conical surface 109 with a descending gradient. The other arrangements of the synthetic resin-made thrust sliding bearing 1 in accordance with this modification shown in FIG. 10 are similar to those of the synthetic resin-made thrust sliding bearing 1 in accordance with the third embodiment shown in FIG. 7. Also with the synthetic resin-made thrust sliding bearing 1 in such an embodiment, if the thickness of the upper annular flat plate-shaped portion 102 at its inner peripheral surface defining the circular hole 101 is assumed to be t, the annular flat surface 107 which is the upper surface of the upper casing 100 may have an outer peripheral edge whose radius R is r−t, or may have an outer peripheral edge whose radius R is r+t. In other words, the annular flat surface 107 may have an outer peripheral edge whose radius R is in a range of r±t.

Figure 11:
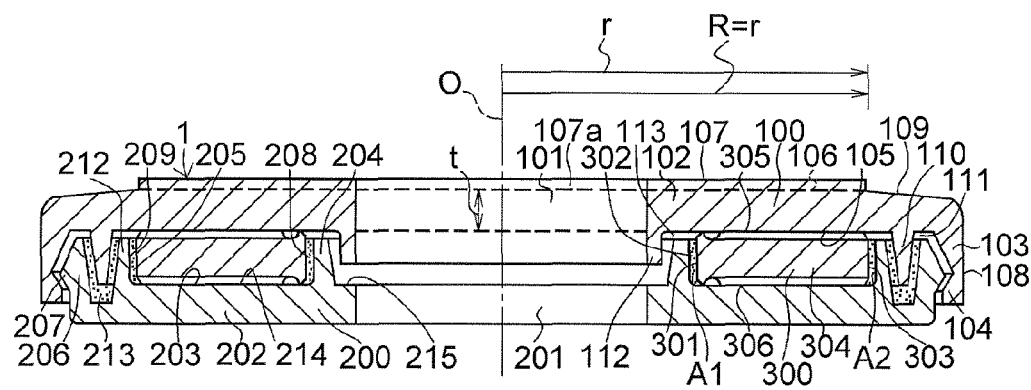
FIG. 11 is a cross-sectional view of the synthetic resin-made thrust sliding bearing in accordance with a preferred fourth embodiment of the invention.

The synthetic resin-made thrust sliding bearing 1 in accordance with a fourth embodiment shown in FIG. 11 is comprised of the synthetic resin-made upper casing 100, the synthetic resin-made lower casing 200, and the synthetic resin-made thrust sliding bearing piece 300 interposed between the upper casing 100 and the lower casing 200.

The upper casing 100 includes the upper annular flat plate-shaped portion 102 having the circular hole 101 in its central portion; a cylindrical suspended portion 112 formed integrally on the lower surface 105 of the upper annular flat plate-shaped portion 102 and having an inside diameter identical to that of the circular hole 101; the cylindrical suspended portion 110 formed integrally on the lower surface 105 of the upper annular flat plate-shaped portion 102 in such a manner as to be radially outwardly spaced apart a predetermined interval from the outer peripheral surface of the cylindrical suspended portion 112, so as to form an upper annular recess 113 in cooperation with the cylindrical suspended portion 112 and the lower surface 105 of the upper annular flat plate-shaped portion 102; the cylindrical suspended portion 103 formed integrally on the outer peripheral edge of the upper annular flat plate-shaped portion 102 in such a manner as to be radially outwardly spaced apart a predetermined interval from the cylindrical suspended portion 110, so as to form the upper outer annular groove 111 in cooperation with the cylindrical suspended portion 110; and the annular engaging portion 104 formed on the inner peripheral surface of the end portion of the cylindrical suspended portion 103.

The lower casing 200 includes the lower annular flat plate-shaped portion 202 having in its central portion the circular hole 201 communicating with the circular hole 101; the annular projection 204 formed integrally on the upper surface 203 of the lower annular flat plate-shaped portion 202 in such a manner as to be radially outwardly spaced apart from the circular hole 201 via an annular shoulder portion 215; the annular projection 212 formed integrally on the upper surface 203 of the lower annular flat plate-shaped portion 202 in such a manner as to be radially outwardly spaced apart a predetermined interval from the annular projection 204, so as to form the lower annular recess 205 in cooperation with the annular projection 204 and the upper surface 203 of the lower annular flat plate-shaped portion 202; the annular projection 206 formed integrally on the outer peripheral edge of the lower annular flat plate-shaped portion 202 in such a manner as to be radially outwardly spaced apart a predetermined interval from the outer peripheral surface of the annular projection 212, so as to form a lower outer annular groove 213 in cooperation with the annular projection 212 and the upper surface 203 of the lower annular flat plate-shaped portion 202; and the annular engaged portion 207 formed on the outer peripheral surface of the end portion of the annular projection 206.

The thrust sliding bearing piece 300 is constituted by the disk 304 which has the circular hole 302 defined by the inner peripheral surface 301 having an inside diameter larger than the outside diameter of the annular projection 204 and has the outer peripheral surface 303 having an outside diameter smaller than the inside diameter of the annular projection 212. The thrust sliding bearing piece 300 is disposed in the lower annular recess 205 while maintaining the inner annular clearance A1 between its inner peripheral surface 301 and the outer peripheral surface 208 of the annular projection 204 and the outer annular clearance A2 between its outer peripheral surface 303 and the inner peripheral surface 209 of the annular projection 212. Further, the thrust sliding bearing piece 300 is disposed between the upper casing 100 and the lower casing 200 such that its upper surface 305 is positioned above the opening of the lower annular recess 205 and is brought into slidable contact with the lower surface 105 of the upper annular flat plate-shaped portion 102, while its lower surface 306 is brought into sliding contact with the upper surface 203 of the lower annular flat plate-shaped portion 202 defining the bottom surface of the lower annular recess 205.

The upper casing 100 is combined with the lower casing 200 by causing the end portion of the cylindrical suspended portion 112 to face the annular shoulder portion 215 and to be radially superposed on the end portion of the annular projection 204, by disposing the end portion of the cylindrical suspended portion 110 in the lower outer annular groove 213 so as to be radially superposed on the end portion of the annular projection 212 and the end portion of the annular projection 206, respectively, and by causing the annular engaging portion 104 to be resiliently fitted to the annular engaged portion 207.

In the synthetic resin-made thrust sliding bearing 1 in accordance with the fourth embodiment, the thrust sliding bearing piece 300, which is disposed in the lower annular recess 205 and is brought into slidable contact with the lower surface 105 of the upper annular flat plate-shaped portion 102 and the upper surface 203 of the lower annular flat plate-shaped portion 202 defining the bottom surface 214 of the lower annular recess 205, respectively, is formed of a polyethylene resin whose density is 0.925 to 0.970 g/cm$^3$, preferably 0.930 to 0.970 g/cm$^3$, and whose melt flow rate (190° C., 2160 g) defined by ISO 1133 (corresponding to JIS K 7210 or ASTM D 1238) is 0.1 to 20 g/10 min, preferably 0.1 to 15 g/10 min, and more preferably 0.1 to 10 g/10 min. Further, a lubricating grease, preferably a silicone grease whose base oil is a silicone oil, whose kinetic viscosity at 25° C. is not less than 100 cSt and not more than 500,000 cSt, preferably not less than 1,000 cSt and not more than 100,000 cSt, and which contains a thickener so as to set its mixture consistency to not less than 200 and not more than 400, preferably not less than 250 and not more than 350, is interposed at sliding interfaces between, on the one hand, the upper surface 305 and the lower surface 306 of the thrust sliding bearing piece 300 formed of the aforementioned polyethylene resin and, on the other hand, the lower surface 105 of the upper annular flat plate-shaped portion 102 and the upper surface 203 of the lower annular flat plate-shaped portion 202. Also, the silicone grease is filled and held in each of the annular clearances A1 and A2 and the lower outer annular groove 213.

The aforementioned silicone grease is thus interposed at the sliding interfaces between, on the one hand, the lower surface 105 of the upper annular flat plate-shaped portion 102 and the upper surface 203 of the lower annular flat plate-shaped portion 202 defining the bottom surface 214 of the lower annular recess 205, and, on the other hand, the upper surface 305 and the lower surface 306, which are respectively brought into slidable contact with the lower surface 105 and the upper surface 203, of the thrust sliding bearing piece 300 disposed in the lower annular recess 205 and formed of the aforementioned specific polyethylene resin. In consequence, enhanced low friction characteristics are exhibited by virtue of the synergistic effect derived from the low friction characteristics of the thrust sliding bearing piece 300 itself and the low friction characteristics of the silicone grease, and the stick-slip phenomenon does not occur during sliding, so that abnormal frictional noise attributable to the stick-slip phenomenon is not generated. In addition, as the aforementioned silicone grease is filled and held in the annular clearances A1 and A2, the silicone grease is constantly supplied to the sliding interface between the lower surface 306 of the thrust sliding bearing piece 300 and the upper surface 203 of the lower annular flat plate-shaped portion 202 defining the bottom surface 214 of the lower annular recess 205, so that low friction characteristics are exhibited over extended periods of time to enable smooth sliding without the occurrence of such as depletion of the silicone grease between the sliding surfaces.

In the synthetic resin-made thrust sliding bearing 1 in accordance with the fourth embodiment, the upper casing 100 is combined with the lower casing 200 by causing the end portion of the cylindrical suspended portion 112 to face the annular shoulder portion 215 and to be radially superposed on the end portion of the annular projection 204, by disposing the end portion of the cylindrical suspended portion 110 in the lower outer annular groove 213 so as to be radially superposed on the end portions of the annular projection 212 and the annular projection 206, respectively, and by causing the annular engaging portion 104 to be resiliently fitted to the annular engaged portion 207. In consequence, a sealed portion based on the labyrinth action is formed on the inner peripheral surface side of the synthetic resin-made thrust sliding bearing 1 at the superposed portions of the cylindrical suspended portion 112 and the annular projection 204, and sealed portions based on the labyrinth action are formed on the outer peripheral surface side at the superposed portions of the cylindrical suspended portion 110, the annular projection 212, and the annular projection 206 and at the resiliently fitting portions of the annular engaging portion 104 and the annular engaged portion 207, respectively. In addition, silicone grease is filled and held in the lower outer annular groove 213. Therefore, foreign objects such as dust which entered from the resiliently fitting portions of the annular engaging portion 104 and the annular engaged portion 207 are captured by the silicone grease filled and held in that lower outer annular groove 213, and are thereby prevented from entering the sliding interfaces. Hence, a dual prevention effect is exhibited on the outer diameter side with respect to the entry of foreign objects such as dust by virtue of the sealed portions based on the labyrinth action.

Also with the synthetic resin-made thrust sliding bearing 1 in accordance with the fourth embodiment, the thrust sliding bearing piece 300 is similar to the thrust sliding bearing piece 300 of the synthetic resin-made thrust sliding bearing 1 in accordance with the above-described first embodiment and, as shown in FIG. 2, should preferably have, on each of its upper surface 305 and lower surface 306 of the thrust sliding bearing piece 300 constituted by the disk 304, the annular groove 307 which surrounds the circular hole 302, as well as the radial grooves 308 each having one end open at the annular groove 307 and the other end open at the outer peripheral surface 303 of the thrust sliding bearing piece 300 constituted by the disk 304 and arranged at equiangular intervals in the circumferential direction. A lubricating grease, preferably the aforementioned silicone grease, is filled and held in the annular groove 307 and the radial grooves 308.

Also with the synthetic resin-made thrust sliding bearing 1 in accordance with the fourth embodiment, as for the upper casing 100 and the lower casing 200, in the same way as the upper casing 100 and the lower casing 200 of the synthetic resin-made thrust sliding bearing 1 in accordance with the above-described first embodiment, a thermoplastic synthetic resin such as polyacetal resin, polyamide resin, and polyester resin or a fiber-reinforced thermoplastic synthetic resin containing in such a thermoplastic synthetic resin reinforcing fibers such as glass fibers, carbon fibers, and aramid fibers is suitably used.

Also with the synthetic resin-made thrust sliding bearing 1 in accordance with the fourth embodiment, in the same way as the synthetic resin-made thrust sliding bearing 1 in accordance with the third embodiment, the annular flat surface 107 is constituted by the upper surface of the annular projecting portion 107a and, if its length to the outer peripheral surface 303 of the thrust sliding bearing piece 300 disposed in the lower annular recess 205 is assumed to be r, the annular flat surface 107 has an outer peripheral edge whose radius R with the axis O of the upper casing 100 set as a center is R=r. The annular projecting portion 107a is continuous from its outer peripheral surface to the truncated conical surface 109 with a descending gradient. Also with the synthetic resin-made thrust sliding bearing 1 in this fourth embodiment, if the thickness of the upper annular flat plate-shaped portion 102 at its inner peripheral surface is assumed to be t, the annular flat surface 107 which is the upper surface of the upper casing 100 may have an outer peripheral edge whose radius R is in the range of R=r±t.

According to the synthetic resin-made thrust sliding bearing 1 in accordance with the fourth embodiment, even in the case where a fluctuating load such as an inclination has acted on the vehicle body-side mounting member X, interference does not occur at radially superposed portions of the cylindrical suspended portion 112 and the annular projection 204, as well as at radially superposed portions of the cylindrical suspended portion 110, the annular projection 212, and the cylindrical suspended portion 103 and at resiliently fitting portions of the annular engaging portion 104 of the cylindrical suspended portion 103 and the annular engaged portion 207 of the annular projection 206. Hence, an operational effect is added in that problems such as deformation, damage, breakage, and the like do not occur in these superposed portions and resiliently fitting portions.

Figure 12:
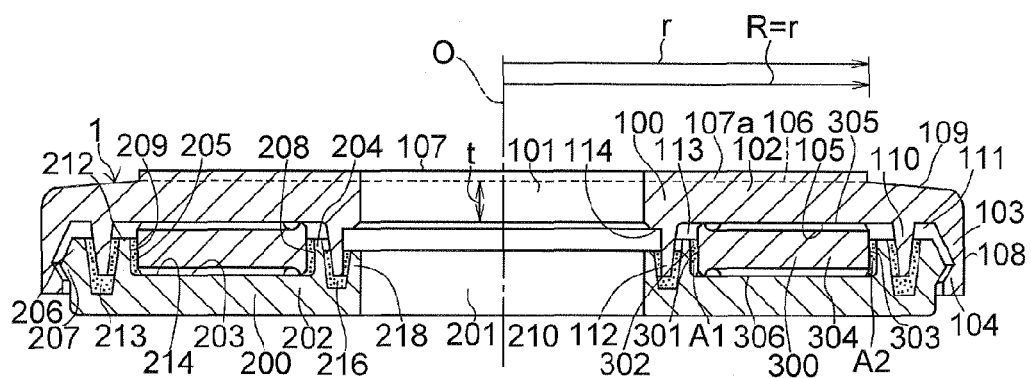
FIG. 12 is a cross-sectional view of the synthetic resin-made thrust sliding bearing in accordance with a preferred fifth embodiment of the invention.

The synthetic resin-made thrust sliding bearing 1 in accordance with a fifth embodiment shown in FIG. 12 is comprised of the synthetic resin-made upper casing 100, the synthetic resin-made lower casing 200, and the synthetic resin-made thrust sliding bearing piece 300 interposed between the upper casing 100 and the lower casing 200.

The upper casing 100 includes the upper annular flat plate-shaped portion 102 having the circular hole 101 in its central portion; the cylindrical suspended portion 112 formed integrally on the lower surface 105 of the upper annular flat plate-shaped portion 102 in such a manner as to be radially outwardly spaced apart from the circular hole 101 via an annular shoulder portion 114; the cylindrical suspended portion 110 formed integrally on the lower surface 105 of the upper annular flat plate-shaped portion 102 in such a manner as to be radially outwardly spaced apart a predetermined interval from the cylindrical suspended portion 112, so as to form the upper annular recess 113 in cooperation with the cylindrical suspended portion 112 and the lower surface 105 of the upper annular flat plate-shaped portion 102; the cylindrical suspended portion 103 formed integrally on the outer peripheral edge of the upper annular flat plate-shaped portion 102 in such a manner as to be radially outwardly spaced apart a predetermined interval from the cylindrical suspended portion 110, so as to form the upper outer annular groove 111 in cooperation with the cylindrical suspended portion 110; and the annular engaging portion 104 formed on the inner peripheral surface of the end portion of the cylindrical suspended portion 103.

The lower casing 200 includes the lower annular flat plate-shaped portion 202 having in its central portion the circular hole 201 communicating with the circular hole 101; an annular projection 218 formed integrally on the lower annular flat plate-shaped portion 202 and having an inside diameter identical to that of the circular hole 201; the annular projection 204 formed integrally on the upper surface 203 of the lower annular flat plate-shaped portion 202 in such a manner as to be radially outwardly spaced apart a predetermined interval from the annular projection 218, so as to form a lower inner annular groove 216 in cooperation with the annular projection 218; the annular projection 212 formed integrally on the upper surface 203 of the lower annular flat plate-shaped portion 202 in such a manner as to be radially outwardly spaced apart a predetermined interval from the annular projection 204, so as to form the lower annular recess 205 in cooperation with the annular projection 204 and the upper surface 203 of the lower annular flat plate-shaped portion 202; the annular projection 206 formed integrally on the outer peripheral edge of the lower annular flat plate-shaped portion 202 in such a manner as to be radially outwardly spaced apart a predetermined interval from the annular projection 212, so as to form the lower outer annular groove 213 in cooperation with the annular projection 212; and the annular engaged portion 207 formed on the outer peripheral surface of the end portion of the annular projection 206.

The thrust sliding bearing piece 300 is constituted by the disk 304 which has the circular hole 302 defined by the inner peripheral surface 301 having an inside diameter larger than the outside diameter of the annular projection 204 and has the outer peripheral surface 303 having an outside diameter smaller than the inside diameter of the annular projection 212. The thrust sliding bearing piece 300 is disposed in the lower annular recess 205 while maintaining the inner annular clearance A1 between its inner peripheral surface 301 and the outer peripheral surface 208 of the annular projection 204 and the outer annular clearance A2 between its outer peripheral surface 303 and the inner peripheral surface 209 of the annular projection 212. Further, the thrust sliding bearing piece 300 is disposed between the upper casing 100 and the lower casing 200 such that its upper surface 305 is positioned above the opening of the lower annular recess 205 and is brought into slidable contact with the lower surface 105 of the upper annular flat plate-shaped portion 102, while its lower surface 306 is brought into slidable contact with the upper surface 203 of the lower annular flat plate-shaped portion 202 defining the bottom surface 214 of the lower annular recess 205.

The upper casing 100 is combined with the lower casing 200 by disposing the end portion of the cylindrical suspended portion 112 in the lower inner annular groove 216 so as to be radially superposed on the end portions of the annular projection 218 and the annular projection 204, by disposing the end portion of the cylindrical suspended portion 110 in the lower outer annular groove 213 so as to be radially superposed on the end portions of the annular projection 212 and the annular projection 206, respectively, and by causing the annular engaging portion 104 to be resiliently fitted to the annular engaged portion 207.

In the synthetic resin-made thrust sliding bearing 1 in accordance with the fifth embodiment, the thrust sliding bearing piece 300, which is disposed in the lower annular recess 205 and is brought into sliding contact with the lower surface 105 of the upper annular flat plate-shaped portion 102 and the upper surface 203 of the lower annular flat plate-shaped portion 202 defining the bottom surface 214 of the lower annular recess 205, respectively, is formed of a polyethylene resin whose density is 0.925 to 0.970 g/cm$^3$, preferably 0.930 to 0.970 g/cm$^3$, and whose melt flow rate (190° C., 2160 g) defined by ISO 1133 (corresponding to JIS K 7210 or ASTM D 1238) is 0.1 to 20 g/10 min, preferably 0.1 to 15 g/10 min, and more preferably 0.1 to 10 g/10 min. Further, a lubricating grease, preferably a silicone grease whose base oil is a silicone oil, whose kinetic viscosity at 25° C. is not less than 100 cSt and not more than 500,000 cSt, preferably not less than 1,000 cSt and not more than 100,000 cSt, and which contains a thickener so as to set its mixture consistency to not less than 200 and not more than 400, preferably not less than 250 and not more than 350, is interposed at sliding interfaces between, on the one hand, the upper surface 305 and the lower surface 306 of the thrust sliding bearing piece 300 formed of the aforementioned polyethylene resin and, on the other hand, the lower surface 105 of the upper annular flat plate-shaped portion 102 and the upper surface 203 of the lower annular flat plate-shaped portion 202. Also, the silicone grease is filled and held in each of the annular clearances A1 and A2, the lower inner annular groove 216, and the lower outer annular groove 213.

The aforementioned silicone grease is thus interposed at the sliding interfaces between, on the one hand, the lower surface 105 of the upper annular flat plate-shaped portion 102 and the upper surface 203 of the lower annular flat plate-shaped portion 202 defining the bottom surface 214 of the lower annular recess 205, and, on the other hand, the upper surface 305 and the lower surface 306, which are respectively brought into sliding contact with the lower surface 105 and the upper surface 203, of the thrust sliding bearing piece 300 disposed in the lower annular recess 205 and formed of the aforementioned specific polyethylene resin. In consequence, enhanced low friction characteristics are exhibited by virtue of the synergistic effect derived from the low friction characteristics of the thrust sliding bearing piece 300 itself and the low friction characteristics of the silicone grease, and the stick-slip phenomenon does not occur during sliding, so that abnormal frictional noise attributable to the stick-slip phenomenon is not generated. In addition, as the aforementioned silicone grease is filled and held in the annular clearances A1 and A2, the silicone grease is constantly supplied to the sliding interface between the lower surface 306 of the thrust sliding bearing piece 300 and the upper surface 203 of the lower annular flat plate-shaped portion 202 defining the bottom surface 214 of the lower annular recess 205, so that low friction characteristics are exhibited over extended periods of time to enable smooth sliding without the occurrence of such as depletion of the silicone grease between the sliding surfaces.

In the synthetic resin-made thrust sliding bearing 1 in accordance with the fifth embodiment, the upper casing 100 is combined with the lower casing 200 by disposing the end portion of the cylindrical suspended portion 112 in the lower inner annular groove 216 so as to be radially superposed on the end portions of the annular projection 218 and the annular projection 204, respectively, by disposing the end portion of the cylindrical suspended portion 110 in the lower outer annular groove 213 so as to be radially superposed on the end portions of the annular projection 212 and the annular projection 206, respectively, and by causing the annular engaging portion 104 to be resiliently fitted to the annular engaged portion 207. In consequence, sealed portions based on the labyrinth action are formed on the inner peripheral surface side of the synthetic resin-made thrust sliding bearing 1 at the superposed portions of the cylindrical suspended portion 112, the annular projection 218, and the annular projection 204, and sealed portions based on the labyrinth action are formed on the outer peripheral surface side at the superposed portions of the cylindrical suspended portion 110, the annular projection 212, and the annular projection 206 and at the resiliently fitting portions of the annular engaging portion 104 and the annular engaged portion 207, respectively. In addition, silicone grease is filled and held in the lower inner annular groove 216 formed on the inner diameter side and in the lower outer annular groove 213 formed on the outer diameter side, respectively. Therefore, foreign objects such as dust which entered from the resiliently fitting portions of the annular engaging portion 104 and the annular engaged portion 207 or from the labyrinth portion on the inner diameter side are captured by the silicone grease filled and held in that lower inner annular groove 216 and that lower outer annular groove 213, and are thereby prevented from entering the sliding interfaces. Hence, a dual prevention effect is exhibited on the inner diameter side and the outer diameter side with respect to the entry of foreign objects such as dust by virtue of the sealed portions based on the labyrinth action.

Also with the synthetic resin-made thrust sliding bearing 1 in accordance with the fifth embodiment, the thrust sliding bearing piece 300 is similar to the thrust sliding bearing piece 300 of the synthetic resin-made thrust sliding bearing 1 in accordance with the above-described first embodiment and, as shown in FIG. 2, should preferably have, on each of its upper surface 305 and lower surface 306 of the thrust sliding bearing piece 300 constituted by the disk 304, the annular groove 307 which surrounds the circular hole 302, as well as the radial grooves 308 each having one end open at the annular groove 307 and the other end open at the outer peripheral surface 303 of the thrust sliding bearing piece 300 constituted by the disk 304 and arranged at equiangular intervals in the circumferential direction. A lubricating grease, preferably the aforementioned silicone grease, is filled and held in the annular groove 307 and the radial grooves 308.

Also with the synthetic resin-made thrust sliding bearing 1 in accordance with the fifth embodiment, as for the upper casing 100 and the lower casing 200, in the same way as the upper casing 100 and the lower casing 200 of the synthetic resin-made thrust sliding bearing 1 in accordance with the above-described first embodiment, a thermoplastic synthetic resin such as polyacetal resin, polyamide resin, and polyester resin or a fiber-reinforced thermoplastic synthetic resin containing in such a thermoplastic synthetic resin reinforcing fibers such as glass fibers, carbon fibers, and aramid fibers is suitably used.

Also with the synthetic resin-made thrust sliding bearing 1 in accordance with the fifth embodiment, in the same way as the synthetic resin-made thrust sliding bearings 1 in accordance with the third and fourth embodiments, the annular flat surface 107 is constituted by the upper surface of the annular projecting portion 107a and, if its length to the outer peripheral surface 303 of the thrust sliding bearing piece 300 disposed in the lower annular recess 205 is assumed to be r, the annular flat surface 107 has an outer peripheral edge whose radius R with the axis O of the upper casing 100 set as a center is R=r. The annular projecting portion 107a is continuous from its outer peripheral surface to the truncated conical surface 109 with a descending gradient. Also with the synthetic resin-made thrust sliding bearing 1 in this fifth embodiment, if the thickness of the upper annular flat plate-shaped portion 102 at its inner peripheral surface is assumed to be t, the annular flat surface 107 which is the upper surface of the upper casing 100 may have an outer peripheral edge whose radius R is in the range of R=r±t.

According to the synthetic resin-made thrust sliding bearing 1 in accordance with the fifth embodiment, even in the case where a fluctuating load such as an inclination has acted on the vehicle body-side mounting member X, interference does not occur at radially superposed portions of the cylindrical suspended portion 112, the annular projection 218, and the annular projection 204, as well as at radially superposed portions of the cylindrical suspended portion 110, the annular projection 212, and the cylindrical suspended portion 103 and at resiliently fitting portions of the annular engaging portion 104 of the cylindrical suspended portion 103 and the annular engaged portion 207 of the annular projection 206. Hence, an operational effect is added in that problems such as deformation, damage, breakage, and the like do not occur in these superposed portions and resiliently fitting portions.

Figure 13:
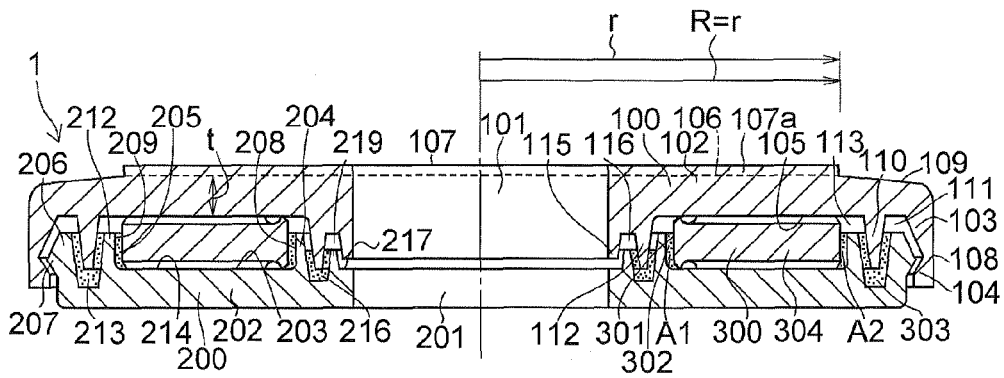
FIG. 13 is a cross-sectional view of the synthetic resin-made thrust sliding bearing in accordance with a preferred sixth embodiment of the invention.
Figure 14:
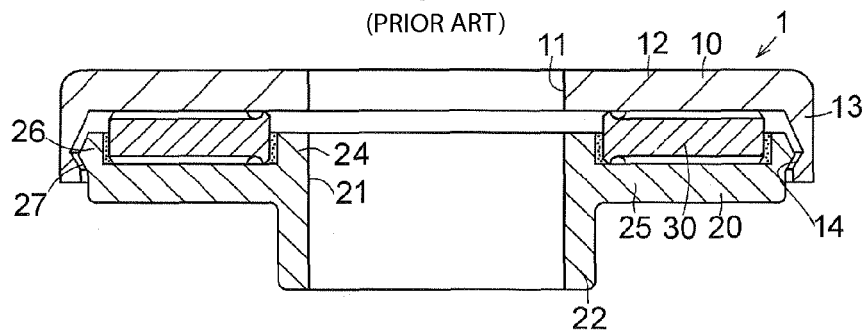
FIG. 14 is a cross-sectional view of a conventional synthetic resin-made thrust sliding bearing.
Figure 15:
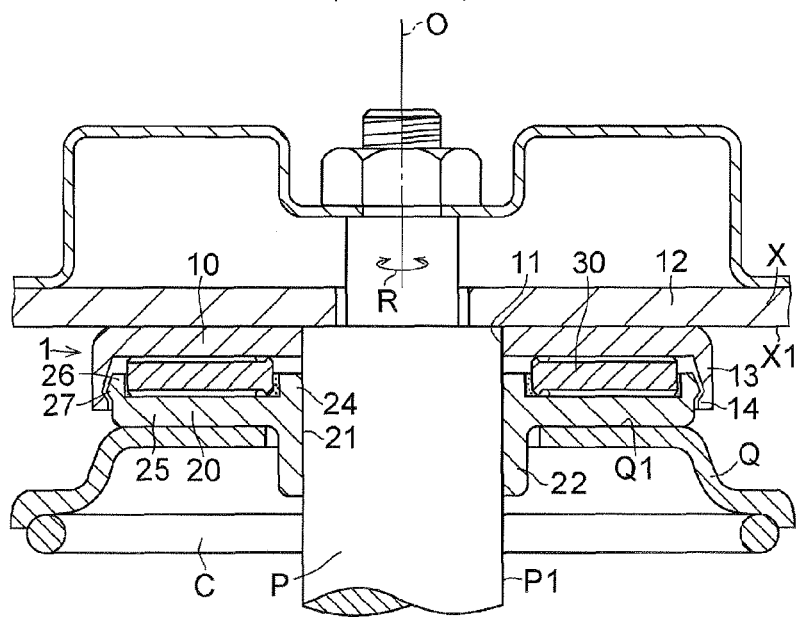
FIG. 15 is a cross-sectional view of an example in which the synthetic resin-made thrust sliding bearing shown in FIG. 14 is incorporated in a strut-type suspension.

The synthetic resin-made thrust sliding bearing 1 in accordance with a sixth embodiment shown in FIG. 13 is comprised of the synthetic resin-made upper casing 100, the synthetic resin-made lower casing 200, and the synthetic resin-made thrust sliding bearing piece 300 interposed between the upper casing 100 and the lower casing 200.

The upper casing 100 includes the upper annular flat plate-shaped portion 102 having the circular hole 101 in its central portion; a cylindrical suspended portion 115 formed integrally on the lower surface of the upper annular flat plate-shaped portion 102 and having an inside diameter identical to that of the circular hole 101; the cylindrical suspended portion 112 formed integrally on the lower surface 105 of the upper annular flat plate-shaped portion 102 in such a manner as to be radially spaced apart a predetermined interval from the cylindrical suspended portion 115, so as to form an upper inner annular groove 116 in cooperation with an outer peripheral surface of the cylindrical suspended portion 115; the cylindrical suspended portion 110 formed integrally on the lower surface 105 of the upper annular flat plate-shaped portion 102 in such a manner as to be radially outwardly spaced apart a predetermined interval from the cylindrical suspended portion 112, so as to form the upper annular recess 113 in cooperation with the cylindrical suspended portion 112 and the lower surface 105 of the upper annular flat plate-shaped portion 102; the cylindrical suspended portion 103 formed integrally on the outer peripheral edge of the upper annular flat plate-shaped portion 102 in such a manner as to be radially outwardly spaced apart a predetermined interval from the cylindrical suspended portion 110, so as to form the upper outer annular groove 111 in cooperation with the cylindrical suspended portion 110; and the annular engaging portion 104 formed on the inner peripheral surface of the end portion of the cylindrical suspended portion 103.

The lower casing 200 includes the lower annular flat plate-shaped portion 202 having in its central portion the circular hole 201 communicating with the circular hole 101; an annular projection 219 formed integrally on the upper surface 203 of the lower annular flat plate-shaped portion 202 in such a manner as to be radially outwardly spaced apart from the circular hole 201 via an annular shoulder portion 217; the annular projection 204 formed integrally on the upper surface 203 of the lower annular flat plate-shaped portion 202 in such a manner as to be radially outwardly spaced apart from the annular projection 219, so as to form the lower inner annular groove 216 in cooperation with the annular projection 219; the annular projection 212 formed integrally on the upper surface 203 of the lower annular flat plate-shaped portion 202 in such a manner as to be radially outwardly spaced apart a predetermined interval from the annular projection 204, so as to form the lower annular recess 205 in cooperation with the upper surface 203 of the lower annular flat plate-shaped portion 202; the annular projection 206 formed integrally on the outer peripheral edge of the lower annular flat plate-shaped portion 202 in such a manner as to be radially outwardly spaced apart a predetermined interval from the annular projection 212, so as to form the lower outer annular groove 213 in cooperation with the annular projection 212; and the annular engaged portion 207 formed on the outer peripheral surface of the end portion of the annular projection 206.

The thrust sliding bearing piece 300 is constituted by the disk 304 which has the circular hole 302 defined by the inner peripheral surface 301 having an inside diameter larger than the outside diameter of the annular projection 204 and has the outer peripheral surface 303 having an outside diameter smaller than the inside diameter of the annular projection 212. The thrust sliding bearing piece 300 is disposed in the lower annular recess 205 while maintaining the inner annular clearance A1 between its inner peripheral surface 301 and the outer peripheral surface 208 of the annular projection 204 and the outer annular clearance A2 between its outer peripheral surface 303 and the inner peripheral surface 209 of the annular projection 212. Further, the thrust sliding bearing piece 300 is disposed between the upper casing 100 and the lower casing 200 such that its upper surface 305 is positioned above the opening of the lower annular recess 205 and is brought into slidable contact with the lower surface 105 of the upper annular flat plate-shaped portion 102, while its lower surface 306 is brought into slidable contact with the upper surface 203 of the lower annular flat plate-shaped portion 202 defining the bottom surface 214 of the lower annular recess 205.

The upper casing 100 is combined with the lower casing 200 by causing the end portion of the cylindrical suspended portion 115 to face the annular shoulder portion 217 and to be radially superposed on the end portion of the annular projection 219, by disposing the end portion of the cylindrical suspended portion 112 in the lower inner annular groove 216 so as to be radially superposed on the end portions of the annular projection 219 and the annular projection 204, respectively, by disposing the end portion of the cylindrical suspended portion 110 in the lower outer annular groove 213 so as to be radially superposed on the end portions of the annular projection 212 and the annular projection 206, respectively, and by causing the annular engaging portion 104 to be resiliently fitted to the annular engaged portion 207.

In the synthetic resin-made thrust sliding bearing 1 in accordance with the sixth embodiment, the thrust sliding bearing piece 300, which is disposed in the lower annular recess 205 and is brought into slidable contact with the lower surface 105 of the upper annular flat plate-shaped portion 102 and the upper surface 203 of the lower annular flat plate-shaped portion 202 defining the bottom surface 214 of the lower annular recess 205, respectively, is formed of a polyethylene resin whose density is 0.925 to 0.970 g/cm$^3$, preferably 0.930 to 0.970 g/cm$^3$, and whose melt flow rate (190° C., 2160 g) defined by ISO 1133 (corresponding to JIS K 7210 or ASTM D 1238) is 0.1 to 20 g/10 min, preferably 0.1 to 15 g/10 min. Further, a lubricating grease, preferably a silicone grease whose base oil is a silicone oil, whose kinetic viscosity at 25° C. is not less than 100 cSt and not more than 500,000 cSt, preferably not less than 1,000 cSt and not more than 100,000 cSt, and which contains a thickener so as to set its mixture consistency to not less than 200 and not more than 400, preferably not less than 250 and not more than 350, is interposed at sliding interfaces between, on the one hand, the upper surface 305 and the lower surface 306 of the thrust sliding bearing piece 300 formed of the aforementioned polyethylene resin and, on the other hand, the lower surface 105 of the upper annular flat plate-shaped portion 102 and the upper surface 203 of the lower annular flat plate-shaped portion 202. Also, the silicone grease is filled and held in each of the annular clearances A1 and A2, the lower inner annular groove 216, and the lower outer annular groove 213.

The aforementioned silicone grease is thus interposed at the sliding interfaces between, on the one hand, the lower surface 105 of the upper annular flat plate-shaped portion 102 and the upper surface 203 of the lower annular flat plate-shaped portion 202 defining the bottom surface 214 of the lower annular recess 205, and, on the other hand, the upper surface 305 and the lower surface 306, which are respectively brought into slidable contact with the lower surface 105 and the upper surface 203, of the thrust sliding bearing piece 300 disposed in the lower annular recess 205 and formed of the aforementioned specific polyethylene resin. In consequence, enhanced low friction characteristics are exhibited by virtue of the synergistic effect derived from the low friction characteristics of the thrust sliding bearing piece 300 itself and the low friction characteristics of the silicone grease, and the stick-slip phenomenon does not occur during sliding, so that abnormal frictional noise attributable to the stick-slip phenomenon is not generated. In addition, as the aforementioned silicone grease is filled and held in the annular clearances A1 and A2, the silicone grease is constantly supplied to the sliding interface between the lower surface 306 of the thrust sliding bearing piece 300 and the upper surface 203 of the lower annular flat plate-shaped portion 202 defining the bottom surface 214 of the lower annular recess 205, so that low friction characteristics are exhibited over extended periods of time to enable smooth sliding without the occurrence of such as depletion of the silicone grease between the sliding surfaces.

In the synthetic resin-made thrust sliding bearing 1 in accordance with the sixth embodiment, the upper casing 100 is combined with the lower casing 200 by causing the end portion of the cylindrical suspended portion 115 to face the annular shoulder portion 217 and to be superposed on the end portion of the annular projection 219, by disposing the end portion of the cylindrical suspended portion 112 in the lower inner annular groove 216 so as to be radially superposed on the end portions of the annular projection 219 and the annular projection 204, respectively, by disposing the end portion of the cylindrical suspended portion 110 in the lower outer annular groove 213 so as to be radially superposed on the end portions of the annular projection 212 and the annular projection 206, respectively, and by causing the annular engaging portion 104 to be resiliently fitted to the annular engaged portion 207. In consequence, sealed portions based on the labyrinth action are formed on the inner peripheral surface side of the synthetic resin-made thrust sliding bearing 1 at the radially superposed portions of the cylindrical suspended portion 115 and the annular projection 219 and at the superposed portions of the cylindrical suspended portion 112, the annular projection 219, and the annular projection 204. Meanwhile, sealed portions based on the labyrinth action are formed on the outer peripheral surface side at the superposed portions of the cylindrical suspended portion 110, the annular projection 212, and the annular projection 206 and at the resiliently fitting portions of the annular engaging portion 104 and the annular engaged portion 207, respectively. Furthermore, silicone grease is filled and held in the lower inner annular groove 216 formed on the inner diameter side and in the lower outer annular groove 213 formed on the outer diameter side, respectively. Therefore, foreign objects such as dust which entered from the resiliently fitting portions of the annular engaging portion 104 and the annular engaged portion 207 or from the labyrinth portion on the inner diameter side are captured by the silicone grease filled and held in that lower inner annular groove 219 and that lower outer annular groove 213, and are thereby prevented from entering the sliding interfaces. Hence, a dual prevention effect is exhibited on the inner diameter side and the outer diameter side with respect to the entry of foreign objects such as dust by virtue of the sealed portions based on the labyrinth action.

Also with the synthetic resin-made thrust sliding bearing 1 in accordance with the sixth embodiment, the thrust sliding bearing piece 300 is similar to the thrust sliding bearing piece 300 of the synthetic resin-made thrust sliding bearing 1 in accordance with the above-described first embodiment and, as shown in FIG. 2, should preferably have, on each of its upper surface 305 and lower surface 306 of the thrust sliding bearing piece 300 constituted by the disk 304, the annular groove 307 which surrounds the circular hole 302, as well as the radial grooves 308 each having one end open at the annular groove 307 and the other end open at the outer peripheral surface 303 of the thrust sliding bearing piece 300 constituted by the disk 304 and arranged at equiangular intervals in the circumferential direction. A lubricating grease, preferably the aforementioned silicone grease, is filled and held in the annular groove 307 and the radial grooves 308.

Also with the synthetic resin-made thrust sliding bearing 1 in accordance with the sixth embodiment, as for the upper casing 100 and the lower casing 200, in the same way as the upper casing 100 and the lower casing 200 of the synthetic resin-made thrust sliding bearing 1 in accordance with the above-described first embodiment, a thermoplastic synthetic resin such as polyacetal resin, polyamide resin, and polyester resin or a fiber-reinforced thermoplastic synthetic resin containing in such a thermoplastic synthetic resin reinforcing fibers such as glass fibers, carbon fibers, and aramid fibers is suitably used.

Also with the synthetic resin-made thrust sliding bearing 1 in accordance with the sixth embodiment, in the same way as the synthetic resin-made thrust sliding bearings 1 in accordance with the third and fourth embodiment, the annular flat surface 107 is constituted by the upper surface of the annular projecting portion $107a$ and, if its length to the outer peripheral surface 303 of the thrust sliding bearing piece 300 disposed in the lower annular recess 205 is assumed to be r, the annular flat surface 107 has an outer peripheral edge whose radius R with the axis O of the upper casing 100 set as a center is R=r. The annular projecting portion $107a$ is continuous from its outer peripheral surface to the truncated conical surface 109 with a descending gradient. Also with the synthetic resin-made thrust sliding bearing 1 in this sixth embodiment, if the thickness of the upper annular flat plate-shaped portion 102 at its inner peripheral surface is assumed to be t, the annular flat surface 107 which is the upper surface of the upper casing 100 may have an outer peripheral edge whose radius R is in the range of R=r±t.

According to the synthetic resin-made thrust sliding bearing 1 in accordance with the sixth embodiment, even in the case where a fluctuating load such as an inclination has acted on the vehicle body-side mounting member X, interference does not occur at radially superposed portions of the cylindrical suspended portion 115 and the annular projection 219, as well as at radially superposed portions of the cylindrical suspended portion 112 and the annular projections 219 and 204, at radially superposed portions of the cylindrical suspended portion 110 and the annular projections 206 and 212, and at resiliently fitting portions of the annular engaging portion 104 of the cylindrical suspended portion 103 and the annular engaged portion 207 of the annular projection 206. Hence, an operational effect is added in that problems such as deformation, damage, breakage, and the like do not occur in these superposed portions and resiliently fitting portions.

In the same way as the synthetic resin-made thrust sliding bearing 1 in accordance with the second embodiment, each of the synthetic resin-made thrust sliding bearings 1 in accordance with the above-described third, fourth, fifth, and sixth embodiments may have, in addition to the above-described construction, the cylindrical portion 211 formed integrally on the lower surface 210 of the lower annular flat plate-shaped portion 202 and having an inside diameter identical to that of the circular hole 201.

INDUSTRIAL APPLICABILITY

As described above, with the synthetic resin-made thrust sliding bearing in accordance with the present invention, the synthetic resin-made upper casing 100, the synthetic resin-made lower casing 200, and the thrust sliding bearing piece 300 interposed between the upper casing 100 and the lower casing 200 are formed of a polyethylene resin whose density is 0.925 to 0.970 g/cm$^3$ and whose melt flow rate (190° C., 2160 g) defined by ISO 1133 (corresponding to JIS K 7210 or ASTM D 1238) is 0.1 to 20 g/10 min. In consequence, between the upper casing 100 and the lower casing 200 which are formed of the synthetic resin and between which the thrust sliding bearing piece 300 is interposed, low friction characteristics are exhibited, smooth sliding is effected at sliding surfaces over extended periods of time without the occurrence of the stick-slip phenomenon, and abnormal frictional noise attributable to the stick-slip phenomenon is not generated. Hence, the synthetic resin-made thrust sliding bearing can be suitably incorporated in a strut-type suspension.

DESCRIPTION OF REFERENCE NUMERALS

1: synthetic resin-made thrust sliding bearing
100: upper casing
101: circular hole
102: upper annular flat plate-shaped portion
103: cylindrical suspended portion
104: annular engaging portion
200: lower casing
201: circular hole
202: lower annular flat plate-shaped portion
204: annular projection
205: lower annular recess
206: annular projection
207: annular engaged portion
300: thrust sliding bearing piece
301: inner peripheral surface
303: outer peripheral surface
308: radial groove

The invention claimed is:

1. A synthetic resin-made thrust sliding bearing including:
    a synthetic resin-made upper casing having an upper annular flat plate-shaped portion;
    a synthetic resin-made lower casing superimposed on said upper casing so as to be rotatable about an axis of said upper casing and having a lower annular flat plate-shaped portion which is opposed to said upper annular flat plate-shaped portion, a first and a second annular projection disposed on said lower annular flat plate-shaped portion concentrically therewith, and a lower annular recess surrounded by said first and said second annular projection;
    a synthetic resin-made thrust sliding bearing piece constituted by a disk which is disposed in the lower annular recess, and is brought into sliding contact with an upper surface of said lower annular flat plate-shaped portion defining a bottom surface of the lower annular recess and a lower surface of said upper annular flat plate-shaped portion, said disk having a circular hole in a central portion thereof; and
    a lubricating grease interposed at sliding interfaces between the lower surface of said upper annular flat plate-shaped portion and the upper surface of said lower annular flat plate-shaped portion defining the bottom surface of the lower annular recess and an upper surface and a lower surface of said thrust sliding bearing piece which are respectively brought into sliding contact with said lower surface and said upper surface,
    said upper casing being combined with said lower casing by causing an outer peripheral edge thereof to be resiliently fitted to an outer peripheral edge of said lower casing,
    said thrust sliding bearing piece being formed of a polyethylene resin whose density is 0.957 to 0.96 g/cm$^3$ and whose melt flow rate (190° C., 2160 g) is 0.25 to 7 g/10 min,
    said lubricating grease including a methylphenyl silicone oil as a base oil and a thickener which is selected from 12(OH)StLi and silica to set a mixture consistency of the lubricating grease to not less than 335 and not more than 358,
    said methylphenyl silicone oil having a coefficient of kinetic viscosity at 25° C. which is not less than 45,000 cSt and not more than 200,000 cSt.

2. The synthetic resin-made thrust sliding bearing according to claim 1, wherein said upper annular flat plate-shaped portion has a circular hole in a central portion thereof, and said lower annular flat plate-shaped portion has in a central portion thereof a circular hole communicating with the circular hole of said upper annular flat plate-shaped portion, and wherein said upper casing has a cylindrical suspended portion formed integrally on an outer peripheral edge of said upper annular flat plate-shaped portion and an annular engaging portion formed on an inner peripheral surface of said cylindrical suspended portion, and said lower casing has an annular engaged portion formed on an outer peripheral surface of said second annular projection, said first annular projection having an inside diameter identical to that of the circular hole of said lower annular flat plate-shaped portion and being formed integrally on the upper surface of said lower annular flat plate-shaped portion, said second annular projection being formed integrally on an outer peripheral edge of said lower annular flat plate-shaped portion in such a manner as to be radially outwardly spaced apart by a predetermined interval from said first annular projection, so as to form the lower annular recess in cooperation with said first annular projection and the upper surface of said lower annular flat plate-shaped portion, said upper casing being combined with said lower casing by causing said annular engaging portion to be resiliently fitted to said annular engaged portion.

3. The synthetic resin-made thrust sliding bearing according to claim 1, wherein an inner peripheral surface of said thrust sliding bearing piece defining a circular hole in a central portion thereof has an inside diameter larger than an outside diameter of said first annular projection, and an outer peripheral surface of said thrust sliding bearing piece has an outside diameter smaller than an inside diameter of said second annular projection, and wherein said thrust sliding bearing piece is disposed in the lower annular recess with annular clearances provided respectively between the inner peripheral surface defining the circular hole thereof and an outer peripheral surface of said first annular projection and between that outer peripheral surface and an inner peripheral surface of said second annular projection, said lubricating grease being filled and held in each of the annular clearances.

4. The synthetic resin-made thrust sliding bearing according to claim 1, wherein said upper annular flat plate-shaped portion has a circular hole in a central portion thereof, and said lower annular flat plate-shaped portion has in a central portion thereof a circular hole communicating with the circular hole of said upper annular flat plate-shaped portion, wherein said upper casing has a first cylindrical suspended portion formed integrally on the lower surface of said upper annular flat plate-shaped portion in such a manner as to be radially outwardly spaced apart by a predetermined interval from a peripheral edge of the circular hole of said upper annular flat plate-shaped portion, a second cylindrical suspended portion formed integrally on an outer peripheral edge of said upper annular flat plate-shaped portion in such a manner as to be radially outwardly spaced apart by a predetermined interval from said first cylindrical suspended portion, so as to form an upper outer annular groove in cooperation with said first cylindrical suspended portion, and an annular engaging portion formed on an inner peripheral surface of said second cylindrical suspended portion, and wherein said lower casing has a third annular projection formed integrally on an outer peripheral edge of said lower annular flat plate-shaped portion in such a manner as to be radially outwardly spaced apart by a predetermined interval from said second annular projection, so as to form a lower outer annular groove in cooperation with said second annular projection, and an annular engaged portion formed on an outer peripheral surface of said third annular projection, said first annular projection having an inside diameter identical to that of the circular hole of said lower annular flat plate-shaped portion and being formed integrally on the upper surface of said lower annular flat plate-shaped portion, said second annular projection being formed integrally on the upper surface of said lower annular flat plate-shaped portion in such a manner as to be radially spaced apart by a predetermined interval from said first annular projection, so as to form the lower annular recess in cooperation with said first annular projection and the upper surface of said lower annular flat plate-shaped portion, said upper casing being combined with said lower casing by disposing an end portion of said first cylindrical suspended portion in the lower outer annular groove so as to be radially superposed on each of said second annular projection and said third annular projection, and by causing said annular engaging portion to be resiliently fitted to said annular engaged portion.

5. The synthetic resin-made thrust sliding bearing according to claim 4, wherein an inner peripheral surface of said thrust sliding bearing piece defining a circular hole in a central portion thereof has an inside diameter larger than an outside diameter of said first annular projection, and an outer peripheral surface of said thrust sliding bearing piece has an outside diameter smaller than an inside diameter of said second annular projection, and wherein said thrust sliding bearing piece is disposed in the lower annular recess with annular clearances provided respectively between the inner peripheral surface defining the circular hole thereof and an outer peripheral surface of said first annular projection and between that outer peripheral surface and an inner peripheral surface of said second annular projection, said lubricating grease being filled and held in each of the annular clearances and the lower outer annular groove.

6. The synthetic resin-made thrust sliding bearing according to claim 1, wherein said upper annular flat plate-shaped portion has a circular hole in a central portion thereof, and said lower annular flat plate-shaped portion has in a central portion thereof a circular hole communicating with the circular hole of said upper annular flat plate-shaped portion, wherein said upper casing has a first cylindrical suspended portion formed integrally on the lower surface of said upper annular flat plate-shaped portion and having an inside diameter identical to that of the circular hole of said upper annular flat plate-shaped portion, a second cylindrical suspended portion formed integrally on the lower surface of said upper annular flat plate-shaped portion in such a manner as to be radially outwardly spaced apart by a predetermined interval from an outer peripheral surface of said first cylindrical suspended portion, so as to form an upper annular recess in cooperation with said first cylindrical suspended portion and the lower surface of said upper annular flat plate-shaped portion, a third cylindrical suspended portion formed integrally on an outer peripheral edge of said upper annular flat plate-shaped portion in such a manner as to be radially outwardly spaced apart by a predetermined interval from said second cylindrical suspended portion, so as to form an upper outer annular groove in cooperation with said second cylindrical suspended portion, and an annular engaging portion formed on an inner peripheral surface of said third cylindrical suspended portion, and wherein said lower casing has a third annular projection formed integrally on an outer peripheral edge of said lower annular flat plate-shaped portion in such a manner as to be radially outwardly spaced apart by a predetermined interval from an outer peripheral surface of said second annular projection, so as to form a lower outer annular groove in cooperation with said second annular projection and the upper surface of said lower annular flat plate-shaped portion, and an annular engaged portion formed on the outer peripheral surface of said third annular projection, said first annular projection being formed integrally on the upper surface of said lower annular flat plate-shaped portion in such a manner as to be radially outwardly spaced apart from the circular hole of said lower annular flat plate-shaped portion via an annular shoulder portion, said second annular projection being formed integrally on the upper surface of said lower annular flat plate-shaped portion in such a manner as to be radially outwardly spaced apart by a predetermined interval from said first annular projection, so as to form the lower annular recess in cooperation with said first annular projection and the upper surface of said lower annular flat plate-shaped portion, said upper casing being combined with said lower casing by radially superposing said first cylindrical suspended portion on said first annular projection, by disposing a lower end of said second cylindrical suspended portion in the lower outer annular groove so as to be radially superposed on each of said second annular projection and said third annular projection, and by causing said annular engaging portion to be resiliently fitted to said annular engaged portion.

7. The synthetic resin-made thrust sliding bearing according to claim 1, wherein said upper annular flat plate-shaped portion has a circular hole in a central portion thereof, and said lower annular flat plate-shaped portion has in a central portion thereof a circular hole communicating with the circular hole of said upper annular flat plate-shaped portion, wherein said upper casing has a first cylindrical suspended portion formed integrally on the lower surface of said upper annular flat plate-shaped portion in such a manner as to be radially outwardly spaced apart from the circular hole of said upper annular flat plate-shaped portion via an annular shoulder portion, a second cylindrical suspended portion formed integrally on the lower surface of said upper annular flat plate-shaped portion in such a manner as to be radially outwardly spaced apart by a predetermined interval from an outer peripheral surface of said first cylindrical suspended portion, so as to form an upper annular recess in cooperation with said first cylindrical suspended portion and the lower surface of said upper annular flat plate-shaped portion, a third cylindrical suspended portion formed integrally on an outer peripheral edge of said upper annular flat plate-shaped portion in such a manner as to be radially outwardly spaced apart by a predetermined interval from said second cylindrical suspended portion, so as to form an upper outer annular groove in cooperation with said second cylindrical suspended portion, and an annular engaging portion formed on an inner peripheral surface of said third cylindrical suspended portion, and wherein said lower casing has a third annular projection formed integrally on said lower annular flat plate-shaped portion and having an inside diameter identical to that of the circular hole of said lower annular flat plate-shaped portion, a fourth annular projection formed integrally on an outer peripheral edge of said lower annular flat plate-shaped portion in such a manner as to be radially outwardly spaced apart by a predetermined interval from said second annular projection, so as to form a lower outer annular groove in cooperation with said second annular projection, and an annular engaged portion formed on the outer peripheral surface of said fourth annular projection, said first annular projection being formed integrally on the upper surface of said lower annular flat plate-shaped portion in such a manner as to be radially outwardly spaced apart by a predetermined interval from said third annular projection, so as to form a lower inner annular groove in cooperation with said third annular projection, said second annular projection being formed integrally on the upper surface of said lower annular flat plate-shaped portion in such a manner as to be radially outwardly spaced apart by a predetermined interval from said first annular projection, so as to form the lower annular recess in cooperation with said first annular projection and the upper surface of said lower annular flat plate-shaped portion, said upper casing being combined with said lower casing by disposing an end portion of said first cylindrical suspended portion in the lower inner annular groove so as to be radially superposed on said first annular projection and said third annular projection, respectively, by disposing an end portion of said second cylindrical suspended portion in the lower outer annular groove so as to be radially superposed on said second annular projection and said fourth annular projection, respectively, and by causing said annular engaging portion to be resiliently fitted to said annular engaged portion.

8. The synthetic resin-made thrust sliding bearing according to claim 7, wherein an inner peripheral surface of said thrust sliding bearing piece defining a circular hole in a central portion thereof has an inside diameter larger than an outside diameter of said first annular projection, and an outer peripheral surface of said thrust sliding bearing piece has an outside diameter smaller than an inside diameter of said second annular projection, and wherein said thrust sliding bearing piece is disposed in the lower annular recess with annular clearances provided respectively between the inner peripheral surface defining the circular hole thereof and an outer peripheral surface of said first annular projection and between that outer peripheral surface and an inner peripheral surface of said second annular projection, said lubricating grease being filled and held in each of the annular clearances, the lower inner annular groove, and the lower outer annular groove.

9. The synthetic resin-made thrust sliding bearing according to claim 1, wherein said upper annular flat plate-shaped portion has a circular hole in a central portion thereof, and said lower annular flat plate-shaped portion has in a central portion thereof a circular hole communicating with the circular hole of said upper annular flat plate-shaped portion, wherein said upper casing has a first cylindrical suspended portion formed integrally on the lower surface of said upper annular flat plate-shaped portion and having an inside diameter identical to that of the circular hole of said upper annular flat plate-shaped portion, a second cylindrical suspended portion formed integrally on the lower surface of said upper annular flat plate-shaped portion in such a manner as to be radially outwardly spaced apart by a predetermined interval from said first cylindrical suspended portion, so as to form an upper inner annular groove in cooperation with an outer peripheral surface of said first cylindrical suspended portion, a third cylindrical suspended portion formed integrally on the lower surface of said upper annular flat plate-shaped portion in such a manner as to be radially outwardly spaced apart by a predetermined interval from said second cylindrical suspended portion, so as to form an upper annular recess in cooperation with said second cylindrical suspended portion and the lower surface of said upper annular flat plate-shaped portion, a fourth cylindrical suspended portion formed integrally on an outer peripheral edge of said upper annular flat plate-shaped portion in such a manner as to be radially outwardly spaced apart by a predetermined interval from said third cylindrical suspended portion, so as to form an upper outer annular groove in cooperation with said third cylindrical suspended portion, and an annular engaging portion formed on an inner peripheral surface of an end portion of said fourth cylindrical suspended portion, and wherein said lower casing has a third annular projection formed integrally on the upper surface of said lower annular flat plate-shaped portion in such a manner as to be radially outwardly spaced apart from the circular hole of said lower annular flat plate-shaped portion via an annular shoulder portion, a fourth annular projection formed integrally on an outer peripheral edge of said lower annular flat plate-shaped portion in such a manner as to be radially outwardly spaced apart by a predetermined interval from said second annular projection, so as to form a lower outer annular groove in cooperation with said second annular projection, and an annular engaged portion formed on an outer peripheral surface of said fourth annular projection, said first annular projection being formed integrally on the upper surface of said lower annular flat plate-shaped portion in such a manner as to be radially outwardly spaced apart by a predetermined interval from said third annular projection, so as to form a lower inner annular groove in cooperation with said third annular projection, said second annular projection being formed integrally on the upper surface of said lower annular flat plate-shaped portion in such a manner as to be radially outwardly spaced apart by a predetermined interval from said first annular projection, so as to form the lower annular recess in cooperation with said first annular projection and the upper surface of said lower annular flat plate-shaped portion, said upper casing being combined with said lower casing by causing said first cylindrical suspended portion to face said annular shoulder portion of said lower casing so as to be radially superposed on an end portion of said third annular projection, by disposing an end portion of said second cylindrical suspended portion in the lower inner annular groove so as to be radially superposed on said first annular projection and said third annular projection, respectively, by disposing an end portion of said third cylindrical suspended portion in the lower outer annular groove so as to be radially superposed on said second annular projection and said fourth annular projection, respectively, and by causing said annular engaging portion to be resiliently fitted to said annular engaged portion.

10. The synthetic resin-made thrust sliding bearing according to claim 1, wherein if it is assumed that a radial length from the axis of said upper casing to the outer peripheral surface of said thrust sliding bearing piece disposed in the lower annular recess is r, and that a thickness of said upper annular flat plate-shaped portion at an inner peripheral surface of the upper annular flat plate-shaped portion defining the circular hole is t, said upper casing has an annular flat surface on an upper surface thereof, said annular flat surface having a circular outer peripheral edge whose radius R with the axis of said upper casing set as a center is in a range of R=r±t.

11. The synthetic resin-made thrust sliding bearing according to claim 10, wherein said upper casing further has an annular projecting portion which integrally projects axially from an upper surface of said upper annular flat plate-shaped portion, the upper surface of said upper casing being an upper surface of said annular projecting portion, said annular flat surface being constituted by the upper surface of said annular projecting portion.

12. The synthetic resin-made thrust sliding bearing according to claim 10, wherein said upper casing has a truncated conical surface portion with a descending gradient which extends from the circular outer peripheral edge of said annular flat surface or from a portion of the upper surface of said upper casing to an outer peripheral surface of said upper casing, said portion located radially outwardly of the circular outer peripheral edge of said annular flat surface.

\* \* \* \* \*